US005907312A

United States Patent [19]
Sato et al.

[11] Patent Number: 5,907,312
[45] Date of Patent: May 25, 1999

[54] THREE-DIMENSIONAL IMAGE DISPLAY DEVICE

[75] Inventors: Shunichi Sato; Koushi Koide, both of Chiba; Yukitaka Shimizu, Narashino, all of Japan

[73] Assignee: Sharp Kabushiki Kaisha, Osaka, Japan

[21] Appl. No.: 08/695,389

[22] Filed: Aug. 9, 1996

[30] Foreign Application Priority Data

Aug. 11, 1995 [JP] Japan ................................. 7-206030
Nov. 6, 1995 [JP] Japan ................................. 7-287110

[51] Int. Cl.$^6$ ................................. G02F 1/1335
[52] U.S. Cl. ................................. 345/31; 345/84; 345/90; 359/1; 359/558; 349/201
[58] Field of Search ................................. 345/30, 31, 84, 345/90, 156; 349/201; 359/1, 9, 10, 558, 636; 395/119–122, 355

[56] References Cited

U.S. PATENT DOCUMENTS

| | | | |
|---|---|---|---|
| 3,856,986 | 12/1974 | Maccuski | 178/6.5 |
| 4,526,439 | 7/1985 | Okoshi et al. | 350/128 |
| 4,812,829 | 3/1989 | Ebina et al. | 340/707 |
| 5,042,909 | 8/1991 | Garcia, Jr. et al. | |
| 5,046,827 | 9/1991 | Frost et al. | 349/112 |
| 5,193,201 | 3/1993 | Tymes | 364/713 |
| 5,299,289 | 3/1994 | Omae et al. | 349/201 |
| 5,301,062 | 4/1994 | Takahashi et al. | |
| 5,315,377 | 5/1994 | Isono et al. | 348/51 |
| 5,430,560 | 7/1995 | Wakai et al. | 359/17 |
| 5,497,254 | 3/1996 | Amaku et al. | 359/53 |
| 5,506,703 | 4/1996 | Suzuki et al. | 359/17 |
| 5,528,402 | 6/1996 | Parker | 349/139 |
| 5,589,956 | 12/1996 | Monishima et al. | 359/15 |
| 5,596,340 | 1/1997 | Otomi | 345/31 |
| 5,621,487 | 4/1997 | Shirochi | 349/112 |
| 5,638,201 | 6/1997 | Bos et al. | 349/129 |

FOREIGN PATENT DOCUMENTS

6-82612  3/1994  Japan .

*Primary Examiner*—Mark K. Zimmerman
*Assistant Examiner*—Vincent E. Kovalick
*Attorney, Agent, or Firm*—Dike, Bronstein, Roberts & Cushman, LLP; David G. Conlin

[57] ABSTRACT

The invention is intended to represent a three-dimensional image of an object just as observable from a viewing point, allowing representation of a semi-transparent image on the condition that its rear side may not transparently visible. A three-dimensional image display device according to the present invention is composed essentially of a laser light source, a modulator, an X-Y deflector, a control computer, an image data memory, a moving flat screen and a projection lens. The screen is constructed of a large number of pixels (e.g., 100 by 100 pixels) and each of the pixels is composed of a large number of diffraction elements (e.g., 5 by 5 diffraction elements). On the basis of three-dimensional image data and desired view-point data, both control and image-data preparing computers perform ON-OFF control of laser radiation onto diffraction elements having different reflection directions to determine displaying condition of a pixel composed of said diffraction elements.

18 Claims, 36 Drawing Sheets

(ENLARGED VIEW OF MICRO-AREA IN A CELL)

$\vec{a}$ : UNIT VECTOR OF THE PERPENDICULAR TO RULING
$\vec{P}$ : UNIT VECTOR OF THE NORMAL TO A GRATING SURFACE
$\vec{S}$ : UNIT VECTOR OF THE NORMAL TO AN INCIDENT PLANE WAVE
$\vec{S'}$: UNIT VECTOR OF THE NORMAL TO AN DIFFRACTED PLANE WAVE $$\vec{S'} = \vec{S} + (m\lambda/d)\vec{a}$$

DIRECTION COSINE $\vec{S} = (\cos\theta \cdot \sin\phi,\ \sin\theta,\ \cos\theta \cdot \cos\phi)$

FIG.34
(A)
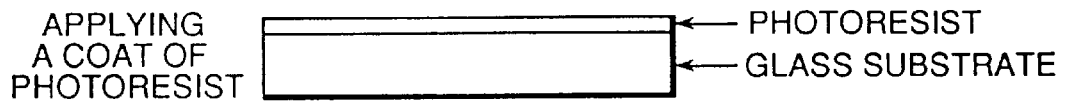
APPLYING A COAT OF PHOTORESIST
(B)
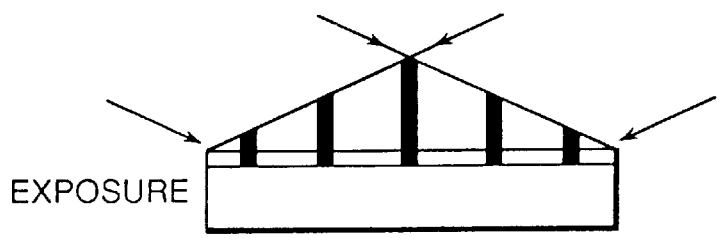
EXPOSURE
(C)
DEVELOPMENT
(D)
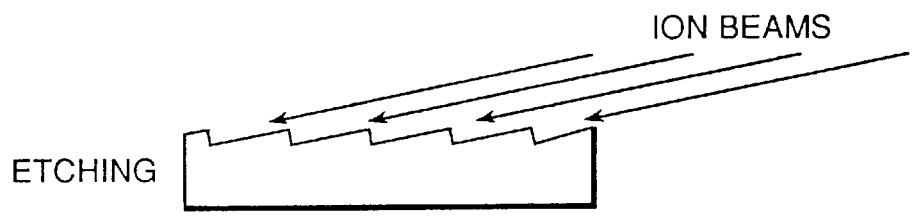
ETCHING
(E)
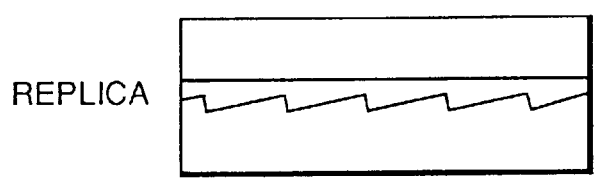
REPLICA
(F)
FINISHING

THREE-DIMENSIONAL IMAGE DISPLAY DEVICE

BACKGROUND OF THE INVENTION

A volumetrically scanning type three-dimensional display is well known as a conventional display for reproducing a three-dimensional image in a space. This type three-dimensional display can reproduce a three-dimensional image that can be naturally focused to be viewed without using any special tool such as a stereoscopic glass.

The above-mentioned conventional volumetrically scanning type three-dimensional image display consists essentially of a laser light source, a modulator, an X-Y deflector, a control computer, an image-data memory and a moving flat screen.

Three-dimensional image data of an object desired to be displayed is first prepared. The moving flat screen moves from a initial position to a last position at a constant speed and instantly returns to the start position, and further repeats said cyclic movement. Cross-section images of the three-dimensional image, which corresponds to respective positions of the moving flat screen, are projected in turn to the moving flat screen by means of raster scanning with laser light under control of the control computer through the modulator and the X-Y deflector. At this time, a three-dimensional image is represented as an afterimage in human eyes in a space determined by multiplying the screen surface area by its moving stroke on the condition that the scanning speed of the laser beam and the moving speed of the moving flat screen are sufficiently synchronized with each other.

The above-mentioned conventional display allows the screen to move at a constant speed to a certain position and instantly return its initial position, i.e., makes the screen realize saw-tooth-like movement along a time base and quick return.

There is shown another example of a conventional three-dimensional display which uses a screen making a spiral movement that continuously varies its height in proportion to its rotation angle. Namely, the screen that rotates about a rotation axis can act like the moving flat screen that makes saw-tooth movement along the time base.

These conventional devices, however, encounter such a problem that laser light striking a point on the screen may reflect or scatter in all directions and may form a three-dimensional image that is a see-through semi-transparent image (with rear side seen therein).

Consequently, application of the conventional devices has been limited to, for example, a three-dimensional representation of previously sectioned images of a CT image, display for showing a relative position of an object in a space for an air-port control radar and the like.

Japanese Laid-Open Patent Publication No. 6-82612 discloses a three-dimensional image display that uses a diffraction grating array that is a substrate with arranged thereon a plurality of cells each consisting of diffraction grating. A three-dimensional image is represented by the diffraction array wherein the cells are divided into areas distributed each to pixels of each parallax image. This method is featured by that an image having parallax can be represented.

The plurality of cells consisting of diffraction grating is disposed on a flat substrate. Each cell is spatially divided into areas with near slope and distance of grating, which areas correspond to respective parallax images. The diffraction grating array is used as a basic device capable of displaying a three-dimensional image having parallax.

This three-dimensional image display using a diffraction grating array comprises a diffraction grating array, a liquid crystal display element being a spatial light-modulating element disposed on the rear surface of the diffraction grating array and a color filter layer disposed on the rear surface of the liquid crystal display element.

In this device, a small area of diffraction grating acts as follows:

The color filter layer selects a certain wave of white incident light, the liquid crystal display element selects transmission or no transmission of light and transmitted light arrives at the above-mentioned small area of the diffraction grating array.

The diffraction grating array made of light-transmission resin plate or the like allows light to pass being diffracted. The outgoing direction of the diffracted light is determined as a diffraction angle decided by a slope of the small area and the grating distance. The small area is seen bright in color of the selected wave when being viewed from the diffraction angle direction.

In conventional two- or three-dimensional display devices, hidden lines or surfaces are removed by using a Z-buffer method that is a memory for storing distance data in the depth direction, which data corresponds to respective pixels stored in the image data memory. The Z-buffer method is such that new pixel data to be outputted to the image data memory is compared to the data stored in the Z-buffer and the contents of the image data memory and the Z-buffer are updated only at a short distance from the view point.

As described above, a three-dimensional image obtained by the conventional three-coordinate scanning method is a semi-transparent image in which its rear side (hidden line or surface) appears. This principal drawback limits the field of its application to display three-dimensional image in predetermined sections (CT images) or relative positions of flying objects for an air-port control radar system and the like. Said drawback of an obtainable three-dimensional image may be eliminated by using a technique for removing hidden lines and hidden surfaces therefrom. The corrected three-dimensional image, however, has a single view point: it does not allow a plurality of observers to observe the image at the same time.

An image obtainable by the display disposed in Japanese Laid-Open Patent Publication No. 6-82612 is an incomplete three-dimensional image, i.e., a stereogram image like a lenticular stereogram image. Therefore, the three-dimensional image shows an object in a position mismatched with an image surface.

Furthermore, a three-dimensional image, from which hidden lines and surfaces have been removed by the Z-buffer method, has a limited view point and can not be observed by a plurality of observers at the same time.

SUMMARY OF THE INVENTION

In view of the above-mentioned problems of the prior art devices, the present invention was made to provide a three-dimensional image display which is capable of obtaining a natural three-dimensional image to be widely applicable by selecting conditions not allowing an obtainable image to have semi-transparency.

The present invention relates to a three-dimensional image display for displaying three-dimensional object represented and processed by a computer and, more particularly, to a three-dimensional image display of the volumetrically scanning type which scans a moving screen surface with a beam or a point beam of light.

The present invention is intended to provide:

(1) A three-dimensional image display, which comprises a screen, modulated light generating means for generating modulated light by specifying a radiating position on the screen and then by modulating light at the specified position on the screen, means for moving the screen so as to volumetrically scan a specified space, data-inputting means for inputting three-dimensional image data and control means for controlling the above-mentioned respective means so as to display an image on the screen on the basis of the three-dimensional image data, and wherein the screen is composed of a plurality of pixels (picture elements), each of said pixels is composed of a plurality of diffraction elements and the control means controls modulation of light to be produced by the light generating means and to be given to the diffraction elements respectively on the basis of the three-dimensional image data. The diffraction elements composing each pixel can be given different characteristics to enable the output beams of light to direct in different directions. The diffracted light can further be controlled by the control mean. Namely, the device defined in the above (1) can produce a three-dimensional image with reality because the control of its displaying means can be adapted to the content of the image to be displayed.

(2) A three-dimensional image display device has the same construction as described in the above (1), wherein the modulated light generating means is composed of beam producing means for generating coherent light, light modulating means for modulating the light beam and scanning means for two-dimensional scanning the light beam. In other words, the work of the modulated light generating means consists of its functional components each taking own share in generating modulated light.

(3) A three-dimensional image display device has the same construction as described in the above (1), wherein the modulated light generating means is composed of light generating means for simultaneously illuminating a whole screen surface, and modulating means for spatially modulating transmittivity of light from the light generating means, and said modulating means is made integrally with the screen. The device can be more simplified because it does not need an optical system for scanning.

(4) A three-dimensional image display device has the same construction as described in the above (3), wherein the modulating means for spatially modulating the transmittance of light is a liquid crystal panel. The device can be more simplified because it does not need an optical system for scanning.

(5) A three-dimensional image display device has the same construction as described in the above (1), wherein the modulated light generating means is composed of a plurality of light-emitting elements which may be integrally made with the screen and which are disposed at respective radiation positions to be radiated and are capable of emitting light to be modulated. The device can be more simplified because it does not need optical systems for scanning and enlarging a diameter of a light beam.

(6) A three-dimensional image display device has the same construction as described in the above (5), wherein an array of laser light-emitting elements is used as the plurality of the light-emitting elements to realize high-speed modulation of light.

(7) A three-dimensional image display device has the same construction as described in the above (5), wherein an array of light-emitting diodes is used as the plurality of the light-emitting elements to realize high-speed modulation and to reduce a manufacturing cost.

(8) A three-dimensional image display device has the same construction as described in any one of the above (1) to (7), wherein incident light entering each of the diffraction elements is a parallel beam of light. This makes it possible to effectively use the display screen on which the light acts (i.e., increasing the efficiency of using the space) and to easily prepare diffraction elements.

(9) A three-dimensional image display device has the same construction as described in the above (8), wherein the parallel beam of light slantingly enters each of the diffraction.

(10) A three-dimensional image display device has the same construction as described in the above (9), wherein the slant incident light generating means may be made integrally with the diffraction elements.

(11) A three-dimensional image display device has the same construction as described in the above (10), wherein the slant incident-light generating means to be integrally made with the diffraction elements is an optical fiber bundle.

(12) A three-dimensional image display device has the same construction as described in any one of the above (1) to (10) and is characterized in that the diffraction element is an elementary hologram. The device can have an excellent in performance and easy-to-manufacture diffraction elements composing the pixels of the screen.

(13) A three-dimensional image display device has the same construction as described in any one of the above (1) to (12), wherein the diffraction elements are made as a blazed diffraction grating not to produce any other diffracted light than positive primary diffraction light.

(14) A three-dimensional image display device has the same construction as described in any one of the above (1) to (13), wherein the control means decides direction of diffraction light of a hidden line and a hidden surface among diffraction rays of light to be emitted from a plurality of the diffraction elements of a pixel according to the three-dimensional image data and then it controls modulation of light illuminating each of the diffraction elements of the pixel so as to remove the hidden line and hidden surface on the basis of the determined diffraction direction.

(15) A three-dimensional image display device has the same construction as described in the above (14), wherein the direction of the diffraction light corresponding to the hidden line and hidden surface can be decided by determining interruption of the light beam with a three-dimensional image by tracing a ray of light to be emitted from each of the diffraction elements.

(16) A three-dimensional image display device has the same construction as described in the above (15), wherein the three-dimensional image is divided into a plurality of areas for tracing the light ray.

(17) A three-dimensional image display device has the same construction as described in the above (16), wherein the three-dimensional image data relates to depth of the image.

(18) A three-dimensional image display device has the same construction as described in any one of the above (1) to (17), wherein the pixels on the screen are distributed to compose two-dimensional areas (two coordinates of three-dimensional system) and the screen moving means moves the screen along one remaining coordinate axis of the three-dimensional system. The device may be easy to manufacture and excellent in performance owing to use of the screen composing two-dimensional display area and having collective displaying pixels.

BRIEF DESCRIPTION OF THE DRAWINGS

FIG. 34 is a view for explaining the procedure for preparing a blazed diffraction element.

PREFERRED EMBODIMENT OF THE INVENTION

A volumetrically scanning type three-dimensional display is well known as a conventional display for reproducing a three-dimensional image in a space. This type three-dimensional display can reproduce a three-dimensional image that can be naturally focused to be viewed without using any special tool such as a stereoscopic glass.

Figure 1:
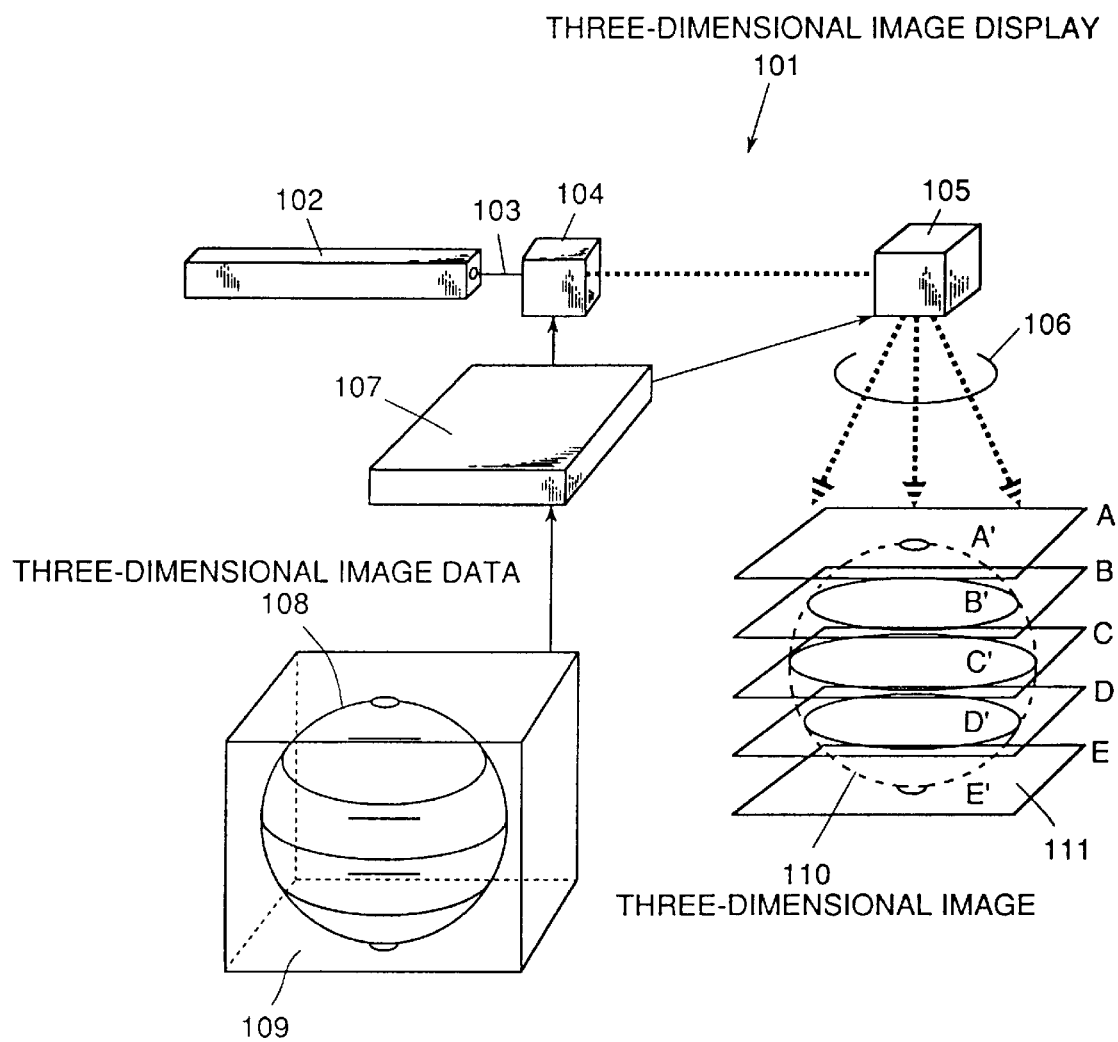
FIG. 1 is a schematic construction view of a conventional three-dimensional image display.

FIG. 1 schematically illustrates the above-mentioned conventional volumetrically scanning type three-dimensional image display which, by way of example and to make the explanation more simple, displays five cross-section images. A three-dimensional image display device 101 consists essentially of a laser light source 102, a modulator 104, an X-Y deflector 105, a control computer 107, an image-data memory 109 and a moving flat screen 111.

Three-dimensional image data 108 of an object desired to be displayed (a spherical object in case of FIG. 1) is first prepared. In FIG. 1, the moving flat screen 111 moves from a position A to a position E at a constant speed and instantly returns to the position A, and further repeats said cyclic movement. Five cross-section images A' to E' of the three-dimensional image, which corresponds to respective positions A to E of the moving flat screen 111, are projected in turn to the moving flat screen 111 by means of raster scanning with laser light 106 under control of the control computer through the modulator 104 and the X-Y deflector 105. At this time, a three-dimensional image 110 is represented as an afterimage in human eyes in a space determined by multiplying the screen surface area by its moving stroke on the condition that the scanning speed of the laser beam 106 and the moving speed of the moving flat screen 111 are sufficiently synchronized with each other.

The above-mentioned conventional display allows the screen to move at a constant speed to a certain position and instantly return its initial position, i.e., makes the screen realize saw-tooth-like movement along a time base and quick return.

Figure 2:
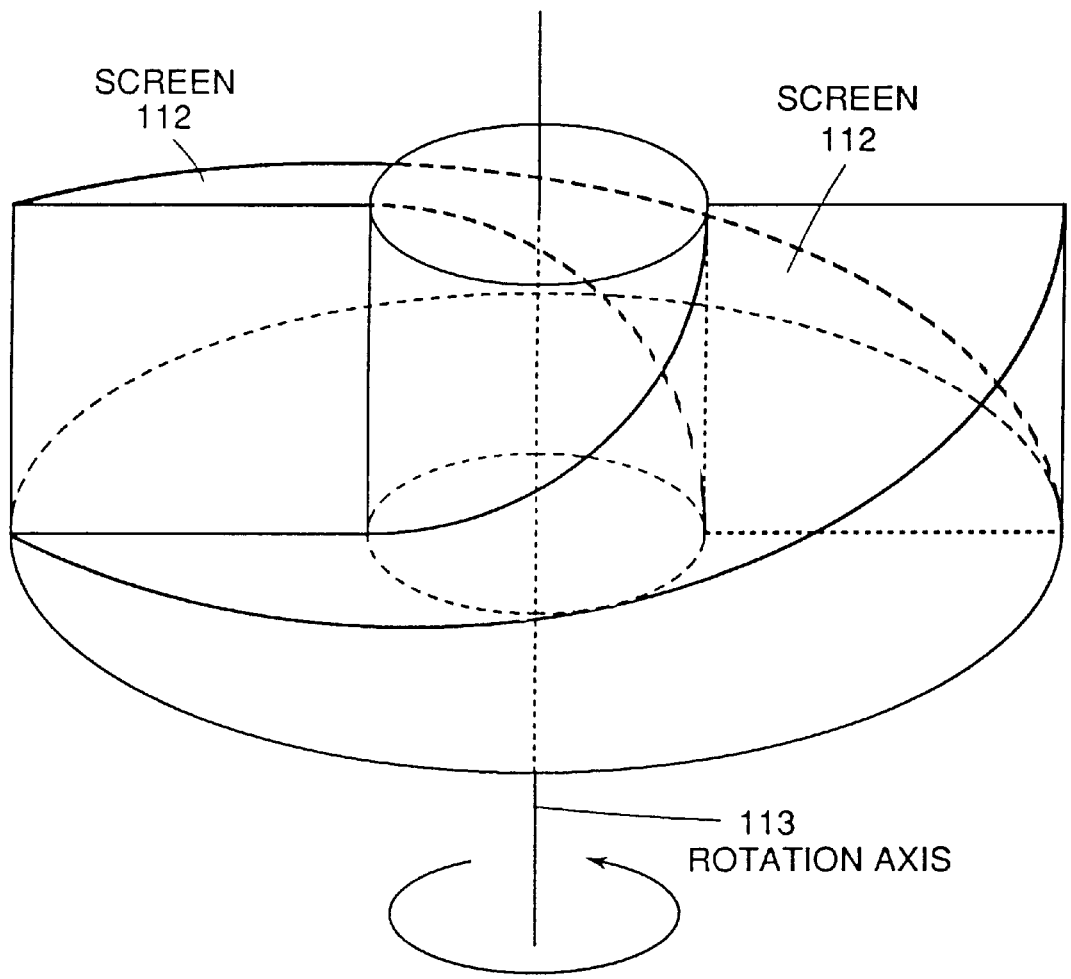
FIG. 2 is a construction view of another moving screen using a conventional three-dimensional display.

In FIG. 2, there is shown another example of a conventional three-dimensional display which uses a screen 112 making a spiral movement that continuously varies its height in proportion to its rotation angle. Namely, the screen 112 that rotates about a rotation axis 113 can act like the moving flat screen that makes saw-tooth movement along the time base.

These conventional devices, however, encounter such a problem that laser light striking a point on the screen 111 or 112 may reflect or scatter in all directions and may form a three-dimensional image that is a see-through semi-transparent image (with rear side seen therein).

Consequently, application of the conventional devices has been limited to, for example, a three-dimensional representation of previously sectioned images of a CT image, display for showing a relative position of an object in a space for an air-port control radar and the like.

Japanese Laid-Open Patent Publication No. 6-82612 discloses a three-dimensional image display that uses a diffraction grating array that is a substrate with arranged thereon a plurality of cells each consisting of diffraction grating. A three-dimensional image is represented by the diffraction array wherein the cells are divided into areas distributed each to pixels of each parallax image. This method is featured by that an image having parallax can be represented.

Figure 4:
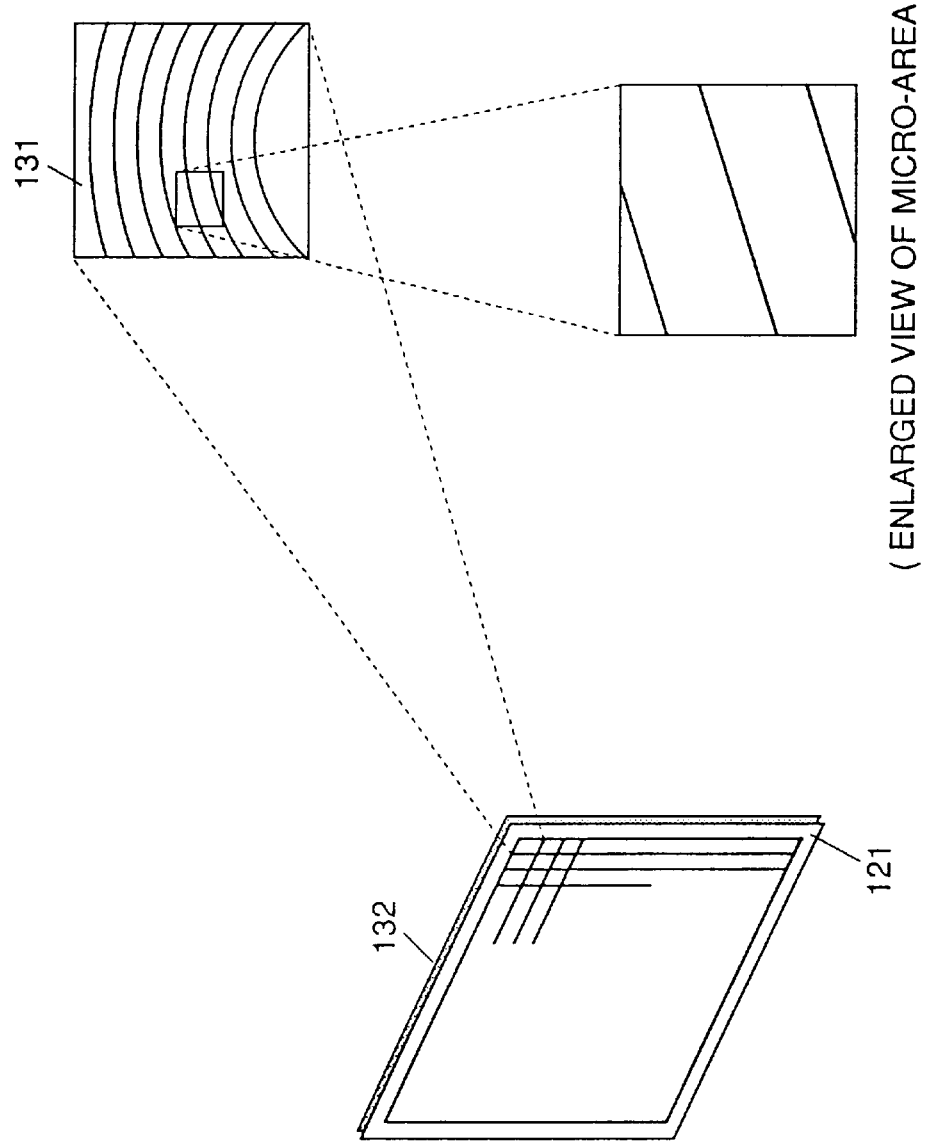
FIG. 4 is a schematic view of a conventional stereoscopic image display using an array of diffraction grating shown in FIG. 3.

FIG. 4 is a diagrammatic view of a diffraction grating array. A plurality of cells 131 consisting of diffraction grating is disposed on a flat substrate 132. Each cell 131 is spatially divided into areas with near slope and distance of grating, which areas correspond to respective parallax images. The diffraction grating array 121 is used as a basic device capable of displaying a three-dimensional image having parallax.

Figure 3:
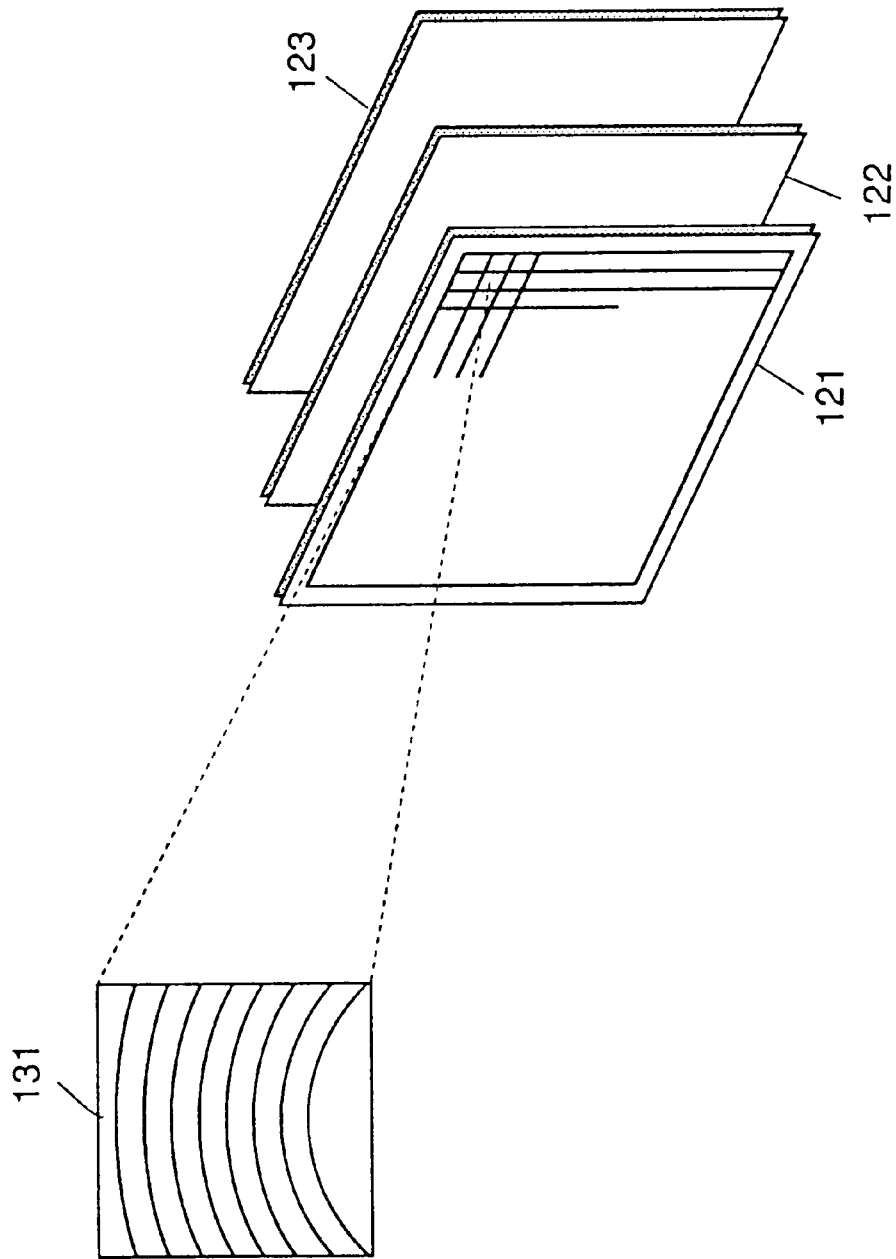
FIG. 3 is a schematic view showing construction and operation of an array of diffraction grating used for a conventional stereoscopic image display.

FIG. 3 is a diagrammatic view of a three-dimensional image display using a diffraction grating array 121. This three-dimensional display comprises a diffraction grating array 121, a liquid crystal display element 122 being a spatial light-modulating element disposed on the rear surface of the diffraction grating array 121 and a color filter layer 123 disposed on the rear surface of the liquid crystal display element 122. In the shown device, a small area of diffraction grating acts as follows:

The color filter layer 123 selects a certain wave of white incident light, the liquid crystal display element 122 selects transmission or no transmission of light and transmitted light arrives at the above-mentioned small area of the diffraction grating array 121.

The diffraction grating array 121 made of light-transmission resin plate or the like allows light to pass being diffracted. The outgoing direction of the diffracted light is determined as a diffraction angle decided by a slope of the small area and the grating distance. The small area is seen bright in color of the selected wave when being viewed from the diffraction angle direction.

In conventional two- or three-dimensional display devices, hidden lines or surfaces are removed by using a Z-buffer that is a memory for storing distance data in the depth direction, which data corresponds to respective pixels stored in the image data memory. The Z-buffer method is such that new pixel data to be outputted to the image data memory is compared to the data stored in the Z-buffer and the contents of the image data memory and the Z-buffer are updated only at a short distance from the view point.

As described above, a three-dimensional image obtained by the conventional three-coordinate scanning method is a semi-transparent image in which its rear side (hidden line or surface) appears. This principal drawback limits the field of its application to display three-dimensional image in predetermined sections (CT images) or relative positions of flying objects for an air-port control radar system and the like. Said drawback of an obtainable three-dimensional image may be eliminated by using a technique for removing hidden lines and hidden surfaces therefrom. The corrected three-dimensional image, however, has a single view point: it does not allow a plurality of observers to observe the image at the same time.

An image obtainable by the display disposed in Japanese Laid-Open Patent Publication No. 6-82612 is an incomplete three-dimensional image, i.e., a stereogram image like a lenticular stereogram image. Therefore, the three-dimensional image shows an object in a position mismatched with an image surface.

Furthermore, a three-dimensional image, from which hidden lines and surfaces have been removed by the Z-buffer method, has a limited view point and can not be observed by a plurality of observers at the same time.

Figure 5:
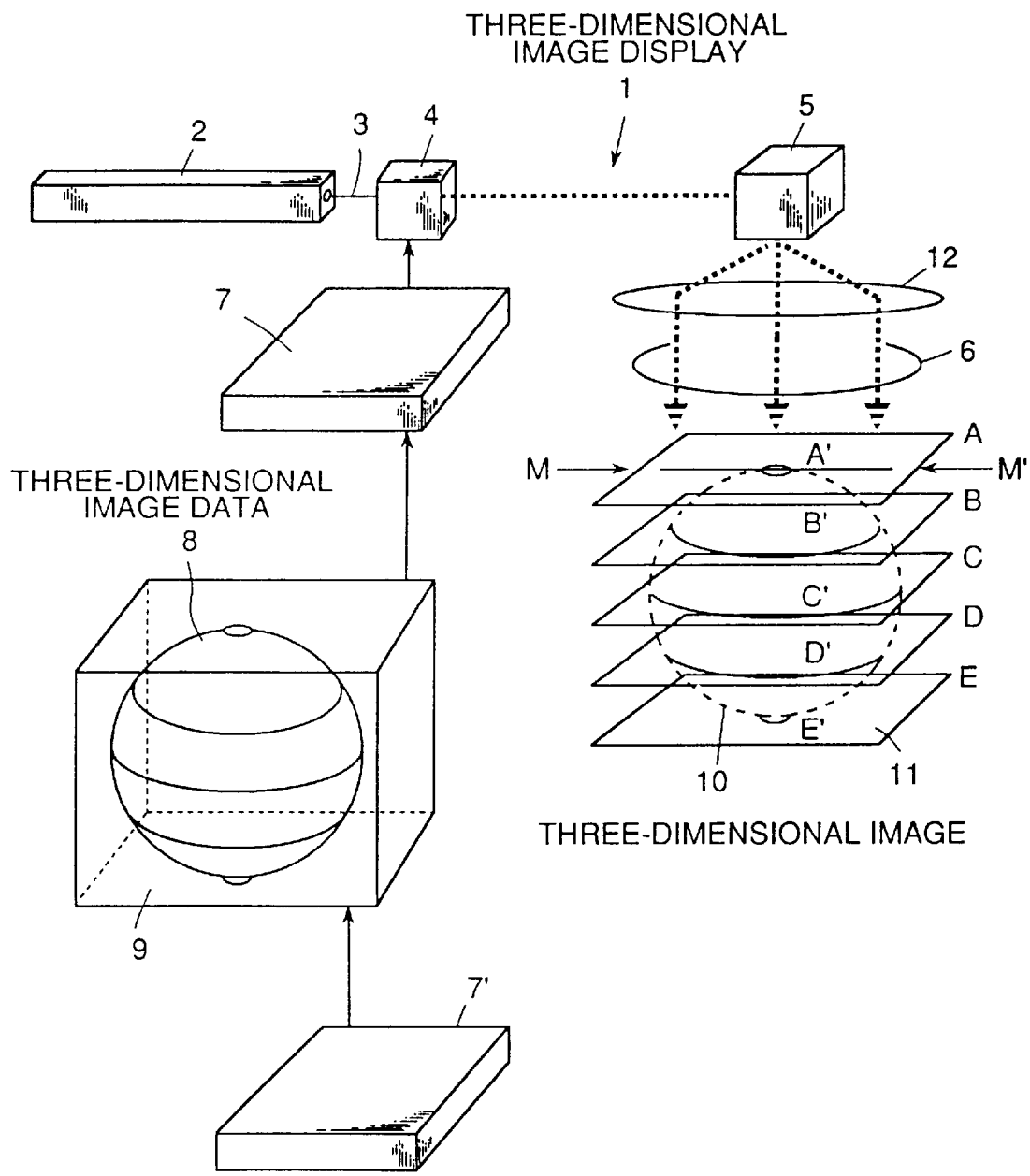
FIG. 5 is a schematic illustration of a light beam scanning type three-dimensional image display device embodying the present invention.

First embodiment:

FIG. 5 is a schematic view of a three-dimensional image display embodying the present invention. By way of an example and to make the description more simple, the shown embodiment works to reproduce 5 sectional images. The three-dimensional image display device 1 consists essentially of a laser light source 2, a modulator 4, X-Y deflector 5, a control computer 7, image data memory 9, a moving flat screen 11, a projection lens 12 and a computer 7' for preparing image data.

Figure 6:
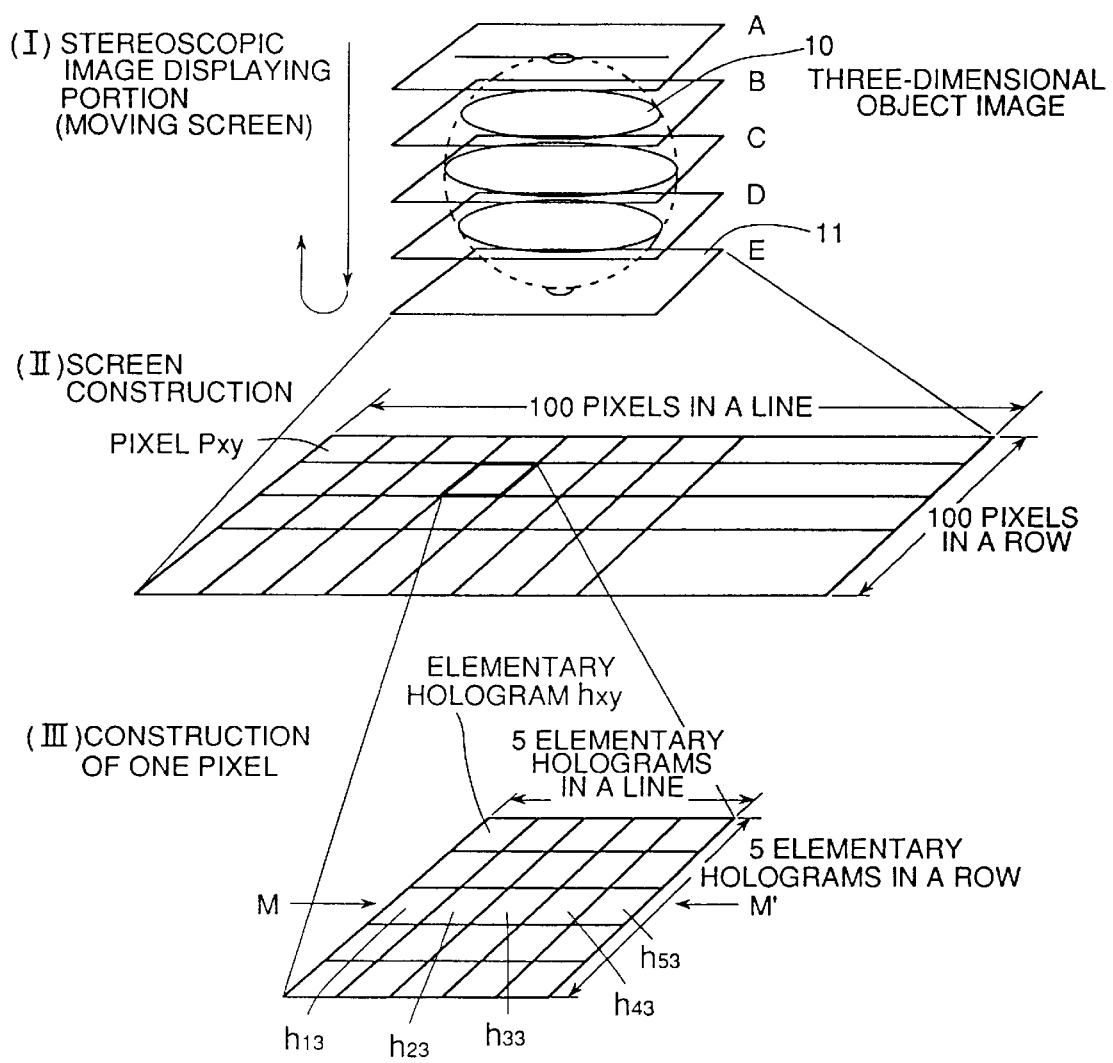
FIG. 6 illustrates a model structure of moving flat screen of a three-dimensional display device according to the present invention.

FIG. 6 schematically illustrates the moving flat screen 11 that is composed of a large number of pixels (e.g., 100 by 100 pixels) (II), each of said pixels consisting of a large number of diffracting elements (e.g., 5 by 5 elements) (III). One computer may serve as the control computer 7 and the image-data generating computer 7'.

In FIG. 5, data 8 for a three-dimensional image desired to be displayed (a spherical body in the shown case) is first prepared in the image data memory 9. The three-dimensional image data 8 includes, in addition to conventional three-dimensional image data, data relative position data of points of each image to be displayed. Using the above-mentioned data makes it possible to represent the object image without appearing its hidden rear side.

As shown in FIG. 6(I), the moving flat screen 11 moves at a constant speed from position A to position E and instantly returns to the position A, then it repeats the above-mentioned reciprocal movement. While the moving flat screen moves, three-dimensional sectional images A' to E' corresponding to respective positions A to E of the moving flat screen 11 are formed in turn. This is realized by the control computer 7 that in this case performs sequential raster scan of the screen with laser light by controlling the modulator 4 and the X-Y deflector 5.

One pixel of an image formed by raster scanning with laser light according to the prior art system scatters the laser light in all directions (in the upper surface direction of the screen). On the other hand, the device according to the present invention controls the direction of light reflected by each of diffraction elements composing each pixel in such manner that diffracted light from each diffraction element may be a beam radiated from one point. The operation principle is such that computer discriminates each point (each surface in case of a polygon) to be seen or not and decides diffraction elements to be radiated with laser light. The prior art system performs raster scanning of the screen by pixel, whereas the present invention system performs raster scanning of each diffraction element of the screen.

At this time, one can see a three-dimensional image 10 by the effect of afterimage in a space determined by the screen area x the moving stroke of the screen 11 on the condition that the moving speed of the moving flat screen 11 and the scanning speed of the laser light 6 are sufficiently high and enough synchronized with each other.

The projection lens 12 allows the laser light 6 to strike the screen 11 at a substantially right angle that is a desirable working condition of this embodiment. This incident angle condition, however, is not always necessary and depends upon the structure of a usable screen.

Figure 8:
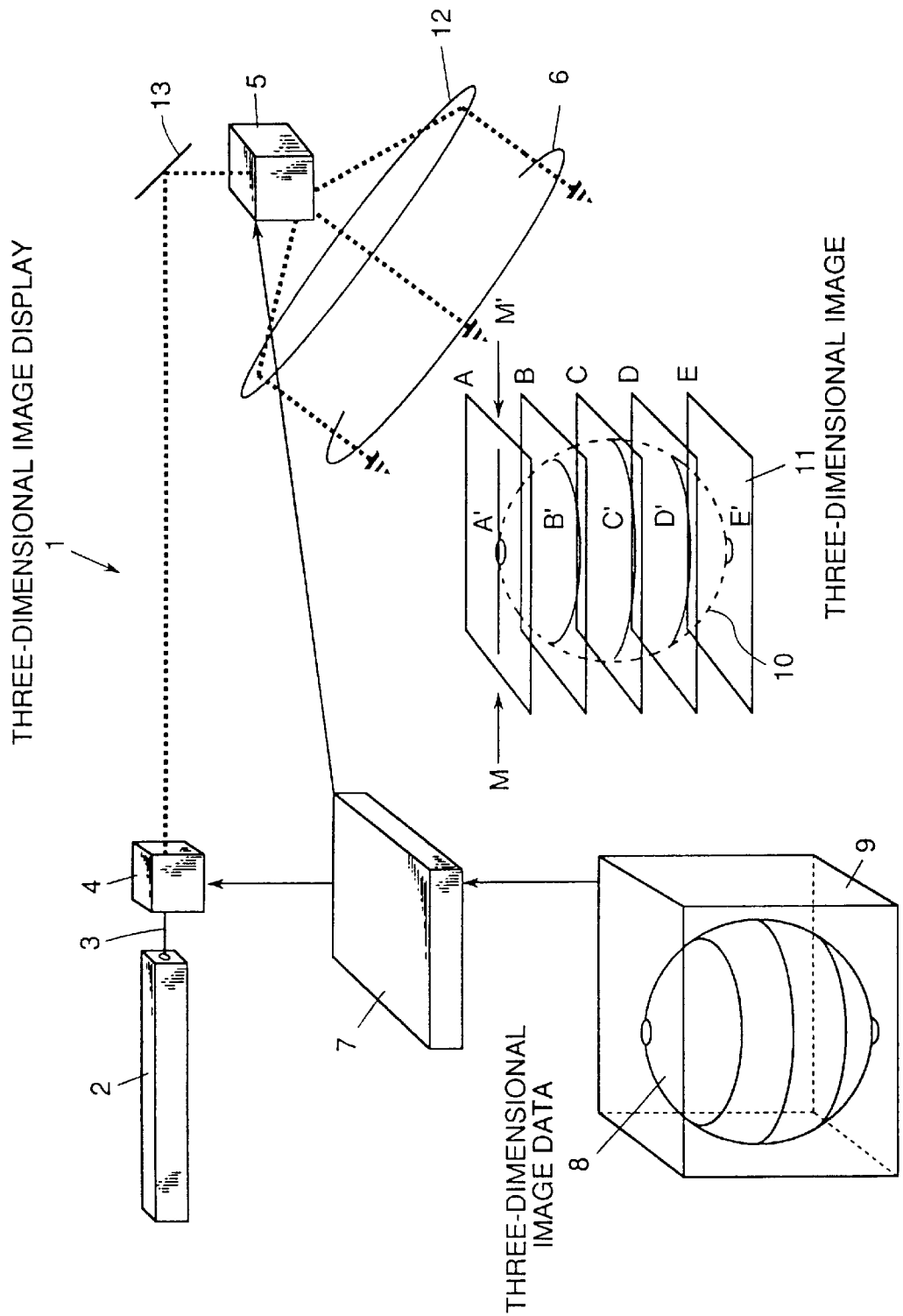
FIG. 8 is a view showing incident laser light slanting into moving flat screen 11 shown in FIG. 5.

FIG. 8 shows a three-dimensional image display wherein incident laser light slants to the moving flat screen (this case will be described later for another embodiment No. 5).

The construction of the moving flat screen 11 is as follows:

Referring to FIG. 6(II), the moving flat screen 11 used in this three-dimensional image display device 1 is composed of a large number of pixels $P_{xy}$, e.g., 100×100 pixels, and each of the pixels consists of a large number of diffraction elements, e.g., 5×5 diffraction elements in case of FIG. 6(II).

In this embodiment, the diffraction elements are elementary holograms (holographic elements) $h_{xy}$ which may act as small diffraction gratings. Pixels $P_{xy}$ may be the same pixels if the incident angle of the image-forming laser light with the moving flat screen is constant during scanning. Namely, 10 thousand pixels $P_{xy}$ are arranged in 100 lines and 100 rows to form the moving flat screen 11. With the pixels illuminated by laser light at different angles, elementary holograms composing each pixel must be corrected depending upon an incident angle of the laser light. In this instance, three-dimensional data of the three-dimensional image to be displayed may be corrected instead of the elementary holograms.

To simplify the description, the laser light is supposed to strike every pixel of the moving flat screen at an angle of about 90°. In this case, the moving flat screen 11 is constructed by repeatedly arranging the same pixels.

Elementary holograms $h_{xy}$ (diffraction elements) are capable of diffracting laser light in different directions. How to diffract laser light by elementary holograms is described below referring to FIG. 7.

Figure 7:
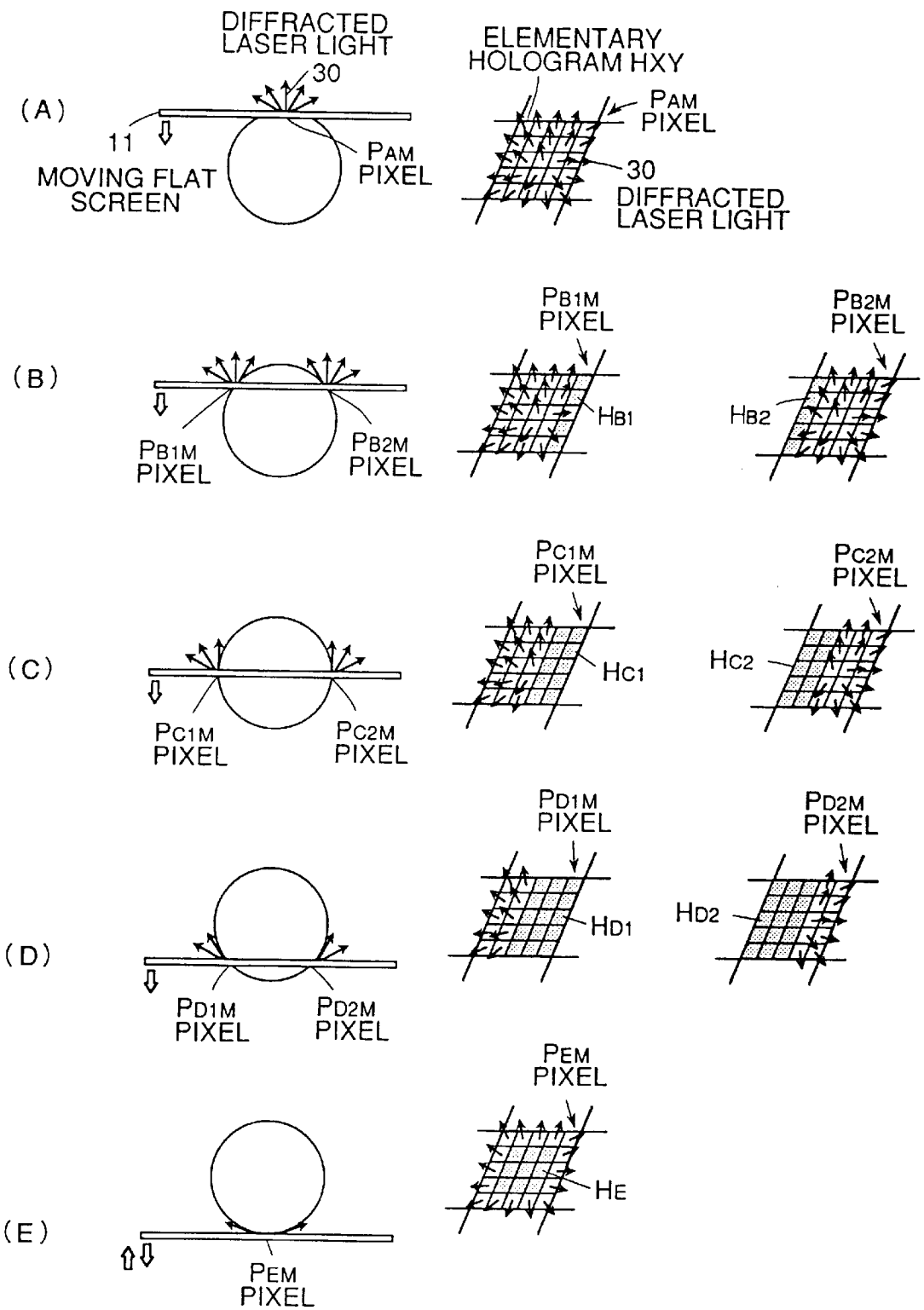
FIG. 7 is a view showing operating state of a moving flat screen of a three-dimensional display device according to the present invention.

FIG. 7 shows laser beams 30 diffracted by respective pixels $P_{AM}$ to $P_{EM}$ each being composed of elementary holograms $h_{xy}$ at respective positions A to E on the moving flat screen 11 in a section M–M' of FIG. 5. In this case, the three-dimensional image is supposed to be of a spherical body being in contact with the pixel $P_{AM}$ at position A on the moving flat screen 11. The pixel $P_{AM}$ can be seen from all directions above the moving flat screen 11. All elementary holograms in the pixel $P_{AM}$ is illuminated by laser light to diffract beams of laser light in all directions. As a pixel $P_{B1M}$ is partly hidden by the upper portion of the spherical body, a rightmost hologram portion $H_{B1}$ of the pixel is not illuminated by laser light. By the same reason, a leftmost hologram portion $H_{B2}$ of a pixel $P_{B2M}$ is not illuminated by laser right. Similarly, pixels $P_{C1M}$ and $P_{C2M}$ are more widely hidden by the spherical body to be displayed and, therefore, two right rows $H_{C1}$ and two left rows $H_{C2}$ of holograms of respective pixels $P_{C1M}$ and $P_{C2M}$ are not illuminated by laser light. Pixels $P_{D1M}$ and $P_{D2M}$ are hidden further widely than the pixels $P_{C1M}$ and $P_{C2M}$. Therefore, three right rows $H_{D1}$ and three left rows $H_{D2}$ of elementary holograms of respective pixels $P_{D1M}$ and $P_{D2M}$ are not illuminated by laser light.

The pixel $P_{EM}$ that locates at the bottom of the spherical body to be displayed is illuminated by laser light only at one peripheral low and line of its holograms. Namely, elementary holograms to be illuminated (or not illuminated) are selected so as not to reflect light in the direction toward the areas $H_E$ hidden by the spherical body to be displayed.

In practice of displaying three-dimensional image, as described above with reference to FIG. 5, the control computer 7 determines illumination or no-illumination of each elementary hologram of each pixel according to desirable view-point data and three-dimensional image data. It also controls the modulator 4 to produce a three-dimensional image of actual object, preventing forming a semi-transparent image with its rear side seen through.

Figure 9:
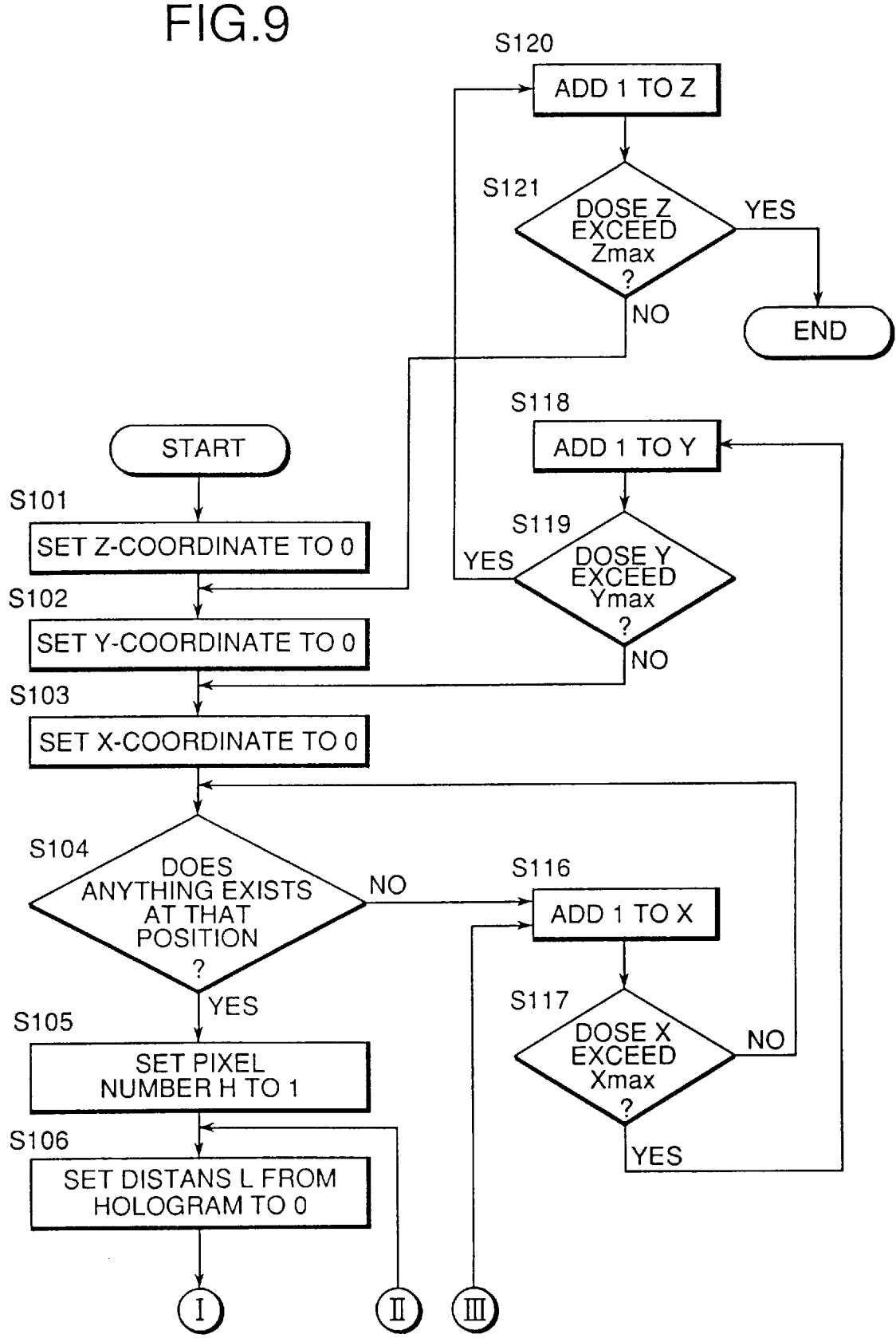
FIG. 9 is a part of flow chart showing a procedure for preparing image data.
Figure 10:
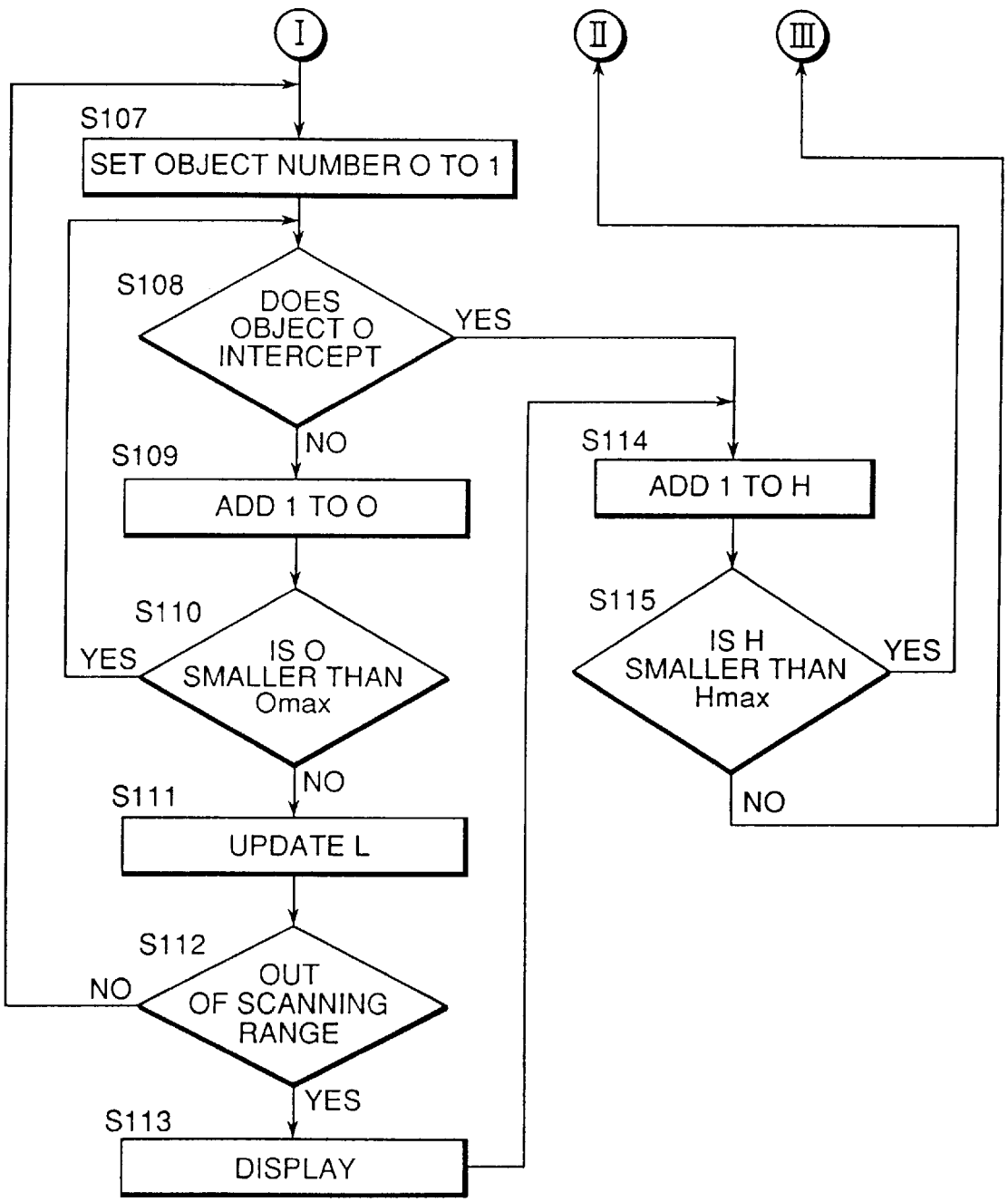
FIG. 10 is a part of flow chart showing a procedure for preparing image data.

Data necessary for above-mentioned control is prepared by the image-data preparing computer 7' on the basis of data stored in the image data memory 9. The method for preparing control data is as follows:

In FIGS. 9 and 10, there is shown a flow chart of a procedure for displaying an image consisting of pixels $X_{max}$ ($X_{max}$=100 in the shown example) in the X-axis direction, pixels $Y_{max}$ ($Y_{max}$=100 in the shown example) in the Y-axis direction and pixels $Z_{max}$ ($Z_{max}$=5 in the shown example) in the Z-axis (depth) direction. Each pixel is composed of elementary holograms $H_{max}$ ($H_{max}$=5×5 in the shown case). The number of objects to be displayed is designated by Omax (Omax=1 in this example).

The computer 7' sets a Z-coordinate value at 0 (Step S101) and a Y-coordinate value at 0 (Step S102) and an X-coordinate value at 0 (Step S103).

Next, the computer 7' performs processing each pixel in X-, Y- and Z-coordinate directions in turn respectively. At Step S104, it examines there is an object to be displayed in a coordinate direction according to the image data. If there is no object (i.e., no processing is required), the processing of current pixel is finished and, then, the procedure is advanced to Step S116 for processing the proceeding coordinate. When there is found any object, each of elementary holograms composing the pixel is examined whether it shall be illuminated by laser light or not (Step S105).

Elementary holograms in each pixel are previously numbered with serial numbers beginning at 1. At Step S105, 1 is set in the number H of an elementary hologram. Each elementary hologram has a predetermined diffracting direction. The diffracting direction is somewhat widened. This width is represented by a central direction value. It may be also represented by other direction width. For example, the direction somewhat shifted in vertical direction is indicated if the image is desired to have a parallax in the vertical direction.

In FIG. 7, the diffracting directions of elementary holograms (of each pixel) are shown by diffracted laser light 30. A distance L from an elementary hologram is set in its diffracting direction.

At Step S106, L is set at 0.

The objects to be displayed are previously numbered with serial numbers beginning at 1.

At Step S107, the object number O is set at 1.

At Step S108, the computer examines whether the object O exists at a position (coordinate) at a distance L from the elementary hologram referring to an image signal: The processing proceeds to Step S114 if light from the elementary hologram is intercepted thereat. It is branched to Step S109 if the light is not intercepted thereat.

At Step S109, the object number O is increased by 1 to examine a next object.

At Step S110, the object number O is updated and examined whether the updated number O is less than Omax. If so, the processing returns to Step S108. If not, the processing advances to Step S111.

At Step S111, the distance is updated for examining the proceeding position (coordinate) by light tracing.

At Step S112, the updated distance L is examined whether it is within the scanning range (display range) of the three-dimensional display or not. If so, the processing returns to Step S107. The updated result exceeding the scanning range shows that nothing has intercepted the light from the elementary hologram, i.e., the hologram must be displayed. Accordingly, the processing goes to Step S113 for displaying processing.

At Step S113, light radiation is effected to obtain diffracted light or obtained information is stored in the memory. Then, the processing advances to Step S114.

For example, laser light diffracted by elementary holograms composing the pixel $P_{AM}$ shown in FIG. 7 can never be intercepted and, therefore, the holograms are all illuminated by laser light. Laser light diffracted by a part $H_{B1}$ of the elementary holograms composing the pixel $P_{B1M}$ is intercepted by itself. Therefore, the elementary holograms of this part $H_{B1}$ are not illuminated by laser light.

At Step S114, the elementary hologram number is increased by 1 to examine proceeding elementary hologram. At Step S115, the new elementary hologram number is checked whether it exceeds the preset value $H_{max}$ or not. If not, the processing returns to Step S106 for processing a proceeding elementary hologram. If the new elementary hologram number exceeds the value $H_{max}$, the processing advances to Step S116 for examining a proceeding coordinate.

At Step S116, the value x is increased by 1 to examine a proceeding pixel.

At Step S117, the updated number x is checked whether it exceeds the preset value $X_{max}$. If the value x is larger than the value $X_{max}$, the processing advances to Step S118. If not so, the processing returns to Step S104.

Steps S118 to S121 are performed for processing elementary holograms of a pixel in the y- and z-directions in the same manner that the processing in the x-direction.

The selection of elementary holograms to be irradiated with laser light is effected according to the above-mentioned procedure.

Figure 11:
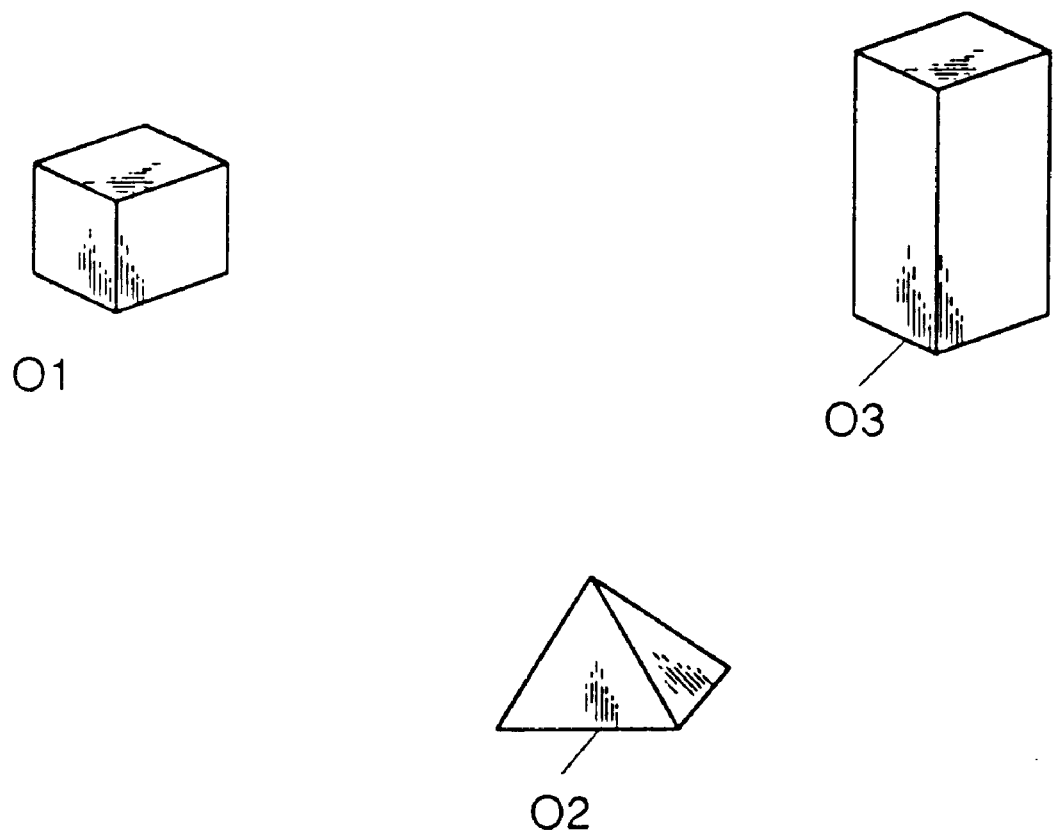
FIG. 11 is a conceptional illustration of an exemplified arrangement of a plurality of three-dimensional objects (image data).

Although the shown embodiment treats with the number (Omax) of objects to be displayed is 1, this procedure can be also applied in the case of displaying the desired number of objects, for example, three objects in the case of FIG. 11.

Methods for preparing elementary holograms $h_{xy}$ and pixels $P_{xy}$ are described as follows:

First is described the case that all pixels $P_{xy}$ composing a moving flat screen 11 are the same. In this instance, elementary holograms $h_{xy}$ for one pixel are prepared and then they are copied pixel by pixel on a whole surface of the moving flat screen 11.

Figure 12:
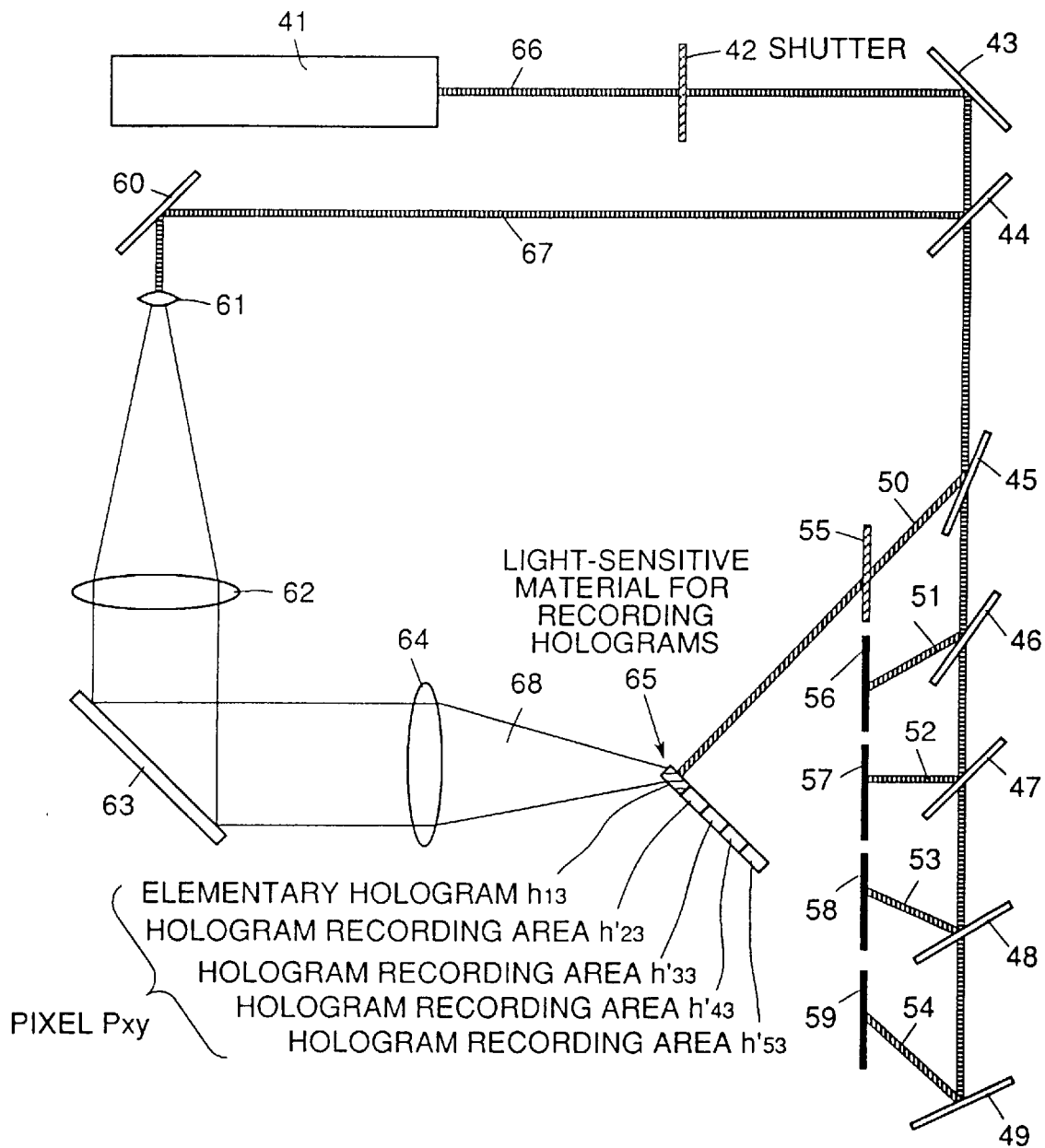
FIG. 12 is a view showing a method for preparing hologram elements composing a moving flat screen usable in an embodiment of the present invention.
Figure 13:
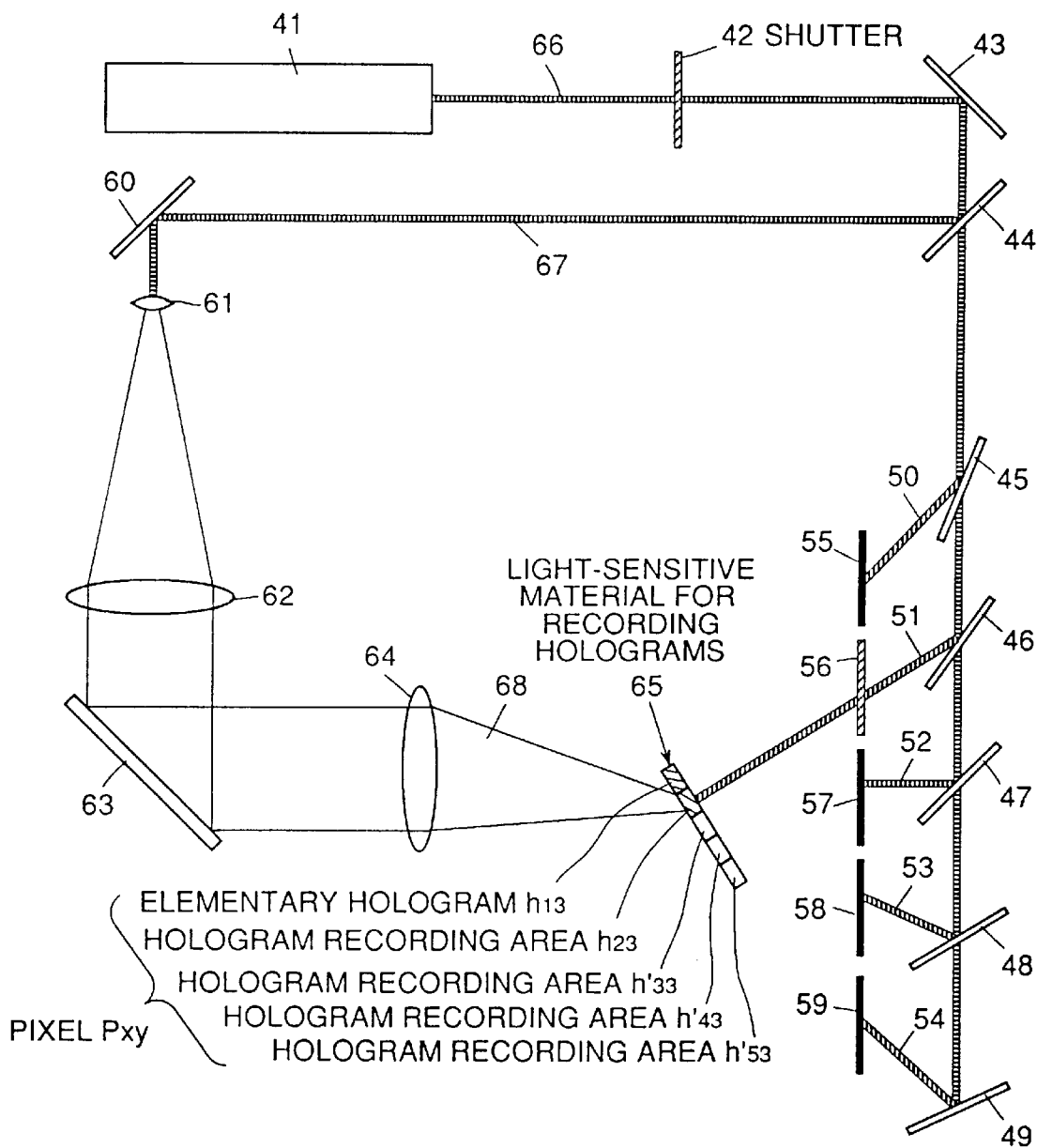
FIG. 13 is a view showing a continuation of the method of FIG. 12 for preparing hologram elements composing a moving flat screen usable in an embodiment of the present invention.

Each elementary hologram is prepared by the following method:

Light-sensitive material such as photopolymer for recording elementary holograms is exposed to light through an optical system arranged as shown in FIGS. 12 and 13. Photopolymer, e.g., HRF series (made by Dupon Company) may be used as light-sensitive material for recording a hologram thereon.

FIG. 12 shows a method for preparing an elementary hologram $h_{13}$ selected among elementary holograms $h_{13}$ to $h_{53}$ shown in a section M–M' of FIG. 6(III). A hologram forming parts h'$_{23}$ to h'$_{53}$ represent still-not-exposed parts of the light-sensitive material 65 for forming holograms thereon. In FIG. 12, laser light 66 emitted from a laser 41 is reflected by a mirror 43 and split in two by a beam splitter (semi-transparent mirror) 44. One beam having transmitted through the beam splitter 44 is directed to splitters 45, 46, 47, 48 and 49. To form the elementary hologram $h_{13}$, a shutter 55 is opened to bring only a laser beam 50 reflected from the beam splitter 45 onto an area on the light-sensitive material 65, which area is reserved for forming the elementary hologram $h_{13}$ thereon. In this instance, the incidence angle of the laser beam falling onto the light-sensitive material has been set at 90° that is equal to the incidence angle of laser light to the screen.

On the other hand, the other laser beam 67 reflected from the beam splitter 44 is further reflected from a mirror 60 and passes through an objective lens 61 and collimating lens 62 being enlarged in its diameter. The enlarged laser beam 67 is reflected from a mirror 63, collected by a collecting lens 62 and objective lens 61, and collected by a collecting lens 64 to form a laser beam 68 that then falls on the designated area on the light-sensitive material 65, which area is reserved for forming the elementary hologram $h_{13}$ thereon. Two beams form an interference pattern that is a lippmann-type (volumetrical) elementary hologram $h_{13}$ in the designated area of the light-sensitive material.

Referring to FIG. 13, the case of preparing an elementary hologram $h_{23}$ is described below:

Holographic light-sensitive material 65 is moved to a position where it may receive laser radiation on its area allocated to forming an elementary hologram $h_{23}$. The inclination of the light-sensitive material 65 is also adjusted so that laser light 51 can strike the material 65 at an incidence angle of about 90° as shown in the instance of forming the hologram $h_{13}$. The shutter 55 is closed and the shutter 56 is opened to introduce the laser light 51 reflected from the beam splitter 46 to the predetermined area on the material 65 where the beam cooperates with the other beam to form an elementary hologram $h_{23}$. Other elementary holograms can be prepared similarly on respective areas on the light-sensitive material 65 by changing the position and inclination of the latter. In this example, 25 (5×5) elementary holograms are prepared to form one pixel as shown in FIG. 6(III).

A numerical aperture of the collecting lens 64 determines a viewing area in which an elementary hologram $h_{xy}$ can be seen. On the other hand, a viewing area of one pixel is determined by multiplying a viewing area of an elementary element by the number of elementary holograms composing the pixel. A viewing area of a whole image can be almost decided by a viewing area of one pixel $P_{xy}$. Accordingly, the numerical number of the collecting lens 64 is decided by a required viewing area of a whole image and the number of elementary holograms $h_{xy}$.

Figure 14:
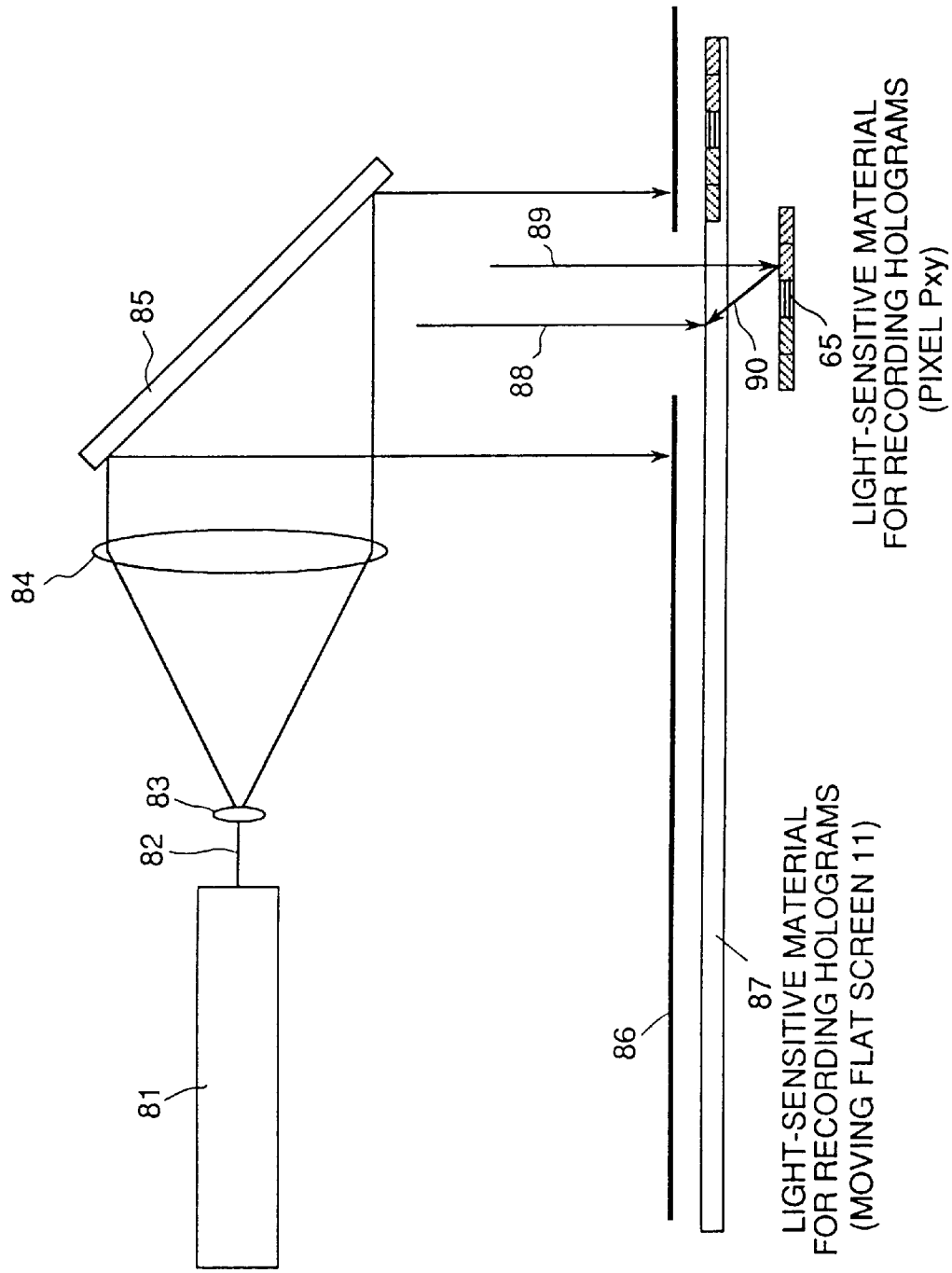
FIG. 14 is a view showing a method for preparing a moving flat screen usable in an embodiment of the present invention.

A method for copying a pixel $P_{xy}$ on holographic light-sensitive material to be used as a screen is described below with reference to FIG. 14 showing an arrangement of an applicable optical system.

In FIG. 14, a laser beam 82 emitted from a laser unit 81 passes through an objective lens 83 and collimating lens 84, being subjected to enlarging its diameter, and is then reflected from a mirror 85 toward a light shield 86 which in turn is timely opened for allowing the laser beam 88 to illuminate one-pixel area on a holographic light-sensitive material 87 forming a moving flat screen 11. The light-sensitive material 65 with the previously prepared thereon elementary holograms for one pixel is disposed on the backside of the light-sensitive material 87. The diffracting gratings recorded in the holographic light-sensitive material 65 acts a laser beam 88 to produce a diffracted laser beam 90 that enters the light-sensitive material 87. Two laser beams 88 and 90 interfere with each other to transfer a copy of the diffraction gratings from the light-sensitive material 65 to the light-sensitive material 87. The light-shield 86 and the holographic light-sensitive material 65 are shifted to a next copying position and the above-mentioned copying operation is repeated. The moving flat screen 11 can be prepared by repeating the above-mentioned procedure.

The laser units 41 and 81 of FIGS. 12 and 13 have the same range of radiation wavelength that the laser light source of FIG. 5 has. In practice, there are used semiconductor neodymium-doped YAG green-light lasers (of 532 nm in wavelength) that can represent a three-dimensional image in green monochrome.

The three-dimensional display having the above-mentioned construction is capable of displaying a three-dimensional image using an afterimage phenomenon in a space determined by the result of multiplying the surface area by the stroke length of the moving flat screen under the condition that the moving speed of the moving flat screen and the scanning rate of the laser beam are both satisfactory high and synchronized with each other.

The three-dimensional display can display colored three-dimensional images if it is provided with three laser-light sources of red, green and blue light respectively and moving flat screen 11 composed of three layers of elementary holograms corresponding to those of three (red, green and blue) colors of laser light respectively.

The elementary holograms corresponding to red, green and blue beams of laser light are prepared by using a dye laser that can emit different ranges of wavelength (611 nm of red light, 544 nm of green light and 453 nm of blue light) in the same optical system shown in FIGS. 12 and 13. It is also possible to prepare holograms by using three separate (red, green and blue) laser light sources.

The moving flat screen 11 is prepared by using a dye laser that can emit different ranges of wavelength and the prepared elementary holograms(for red, green and blue images) in the same optical system shown in FIG. 14. Three prepared screens corresponding to red, green and blue colors respectively are laid on each other to form a moving flat screen 11 for color image display. This moving flat screen 11 has a peak of diffraction efficiency in a plurality of wavelength ranges and it may have a substantially neutral (white) color light when beams of said different wavelengths are mixed.

The color laser units to be used in the three-dimensional color-image display device have the same wavelengths as those of the color laser units used for the above-mentioned moving flat screen 11.

The shown embodiment of the present invention may use, instead of the above-mentioned moving flat screen, the prior art screen shown in FIG. 2, which can realize helical movement continuously changing height in proportion with its rotation angle, instead of the moving flat screen.

Other than Lippmann type elementary holograms, Fresnel type elementary holograms and diffraction gratings may be used as diffraction elements for the shown embodiment. The moving flat screen made with Lippmann type elementary holograms is of reflection type while the moving flat screen made with Fresnel type elementary holograms or diffraction gratings is of reflection type or transmission type.

Second embodiment:

As described above, the first embodiment of the present invention uses a reflection type moving flat screen consisting of reflection (Lippmann) type diffraction elements, which requires scanning means for scanning its entire surface with laser light.

On the contrary, the second embodiment which, instead of the scanning and modulating means, uses means for enlarging the diameter of light beam and means for spatially modulating transmittance (like a liquid crystal panel) as a modulated light generating device. This embodiment will be described below referring to FIG. 15.

Figure 15:
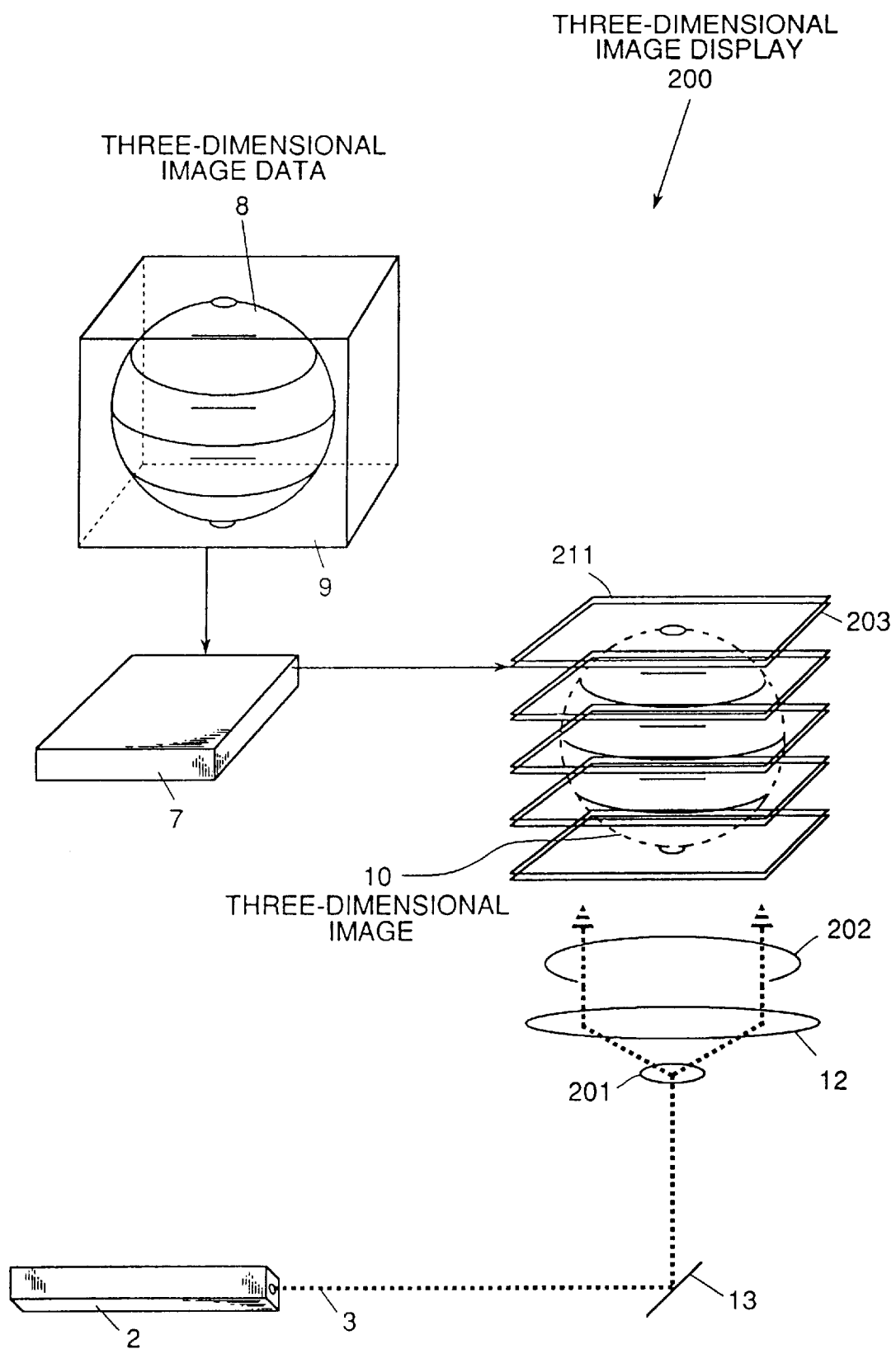
FIG. 15 is a schematic view showing a three-dimensional image display device which is based on light transmittance modulation and which is an embodiment of the present invention.

FIG. 15 is a construction view of a three-dimensional image display device embodying the present invention. Laser light 3 from a laser light source 2 is reflected by a mirror 13 and passes through an objective lens 201 and projecting lens 12, whereby the light is converted to laser light 202 of a divergent spherical wave (by the effect of the objective lens 201) and of an enlarged diameter (by the effect of the projecting lens 12). The laser light 202 illuminates a whole surface of a liquid crystal panel 203 integrally made with a moving flat screen 211.

Figure 16:
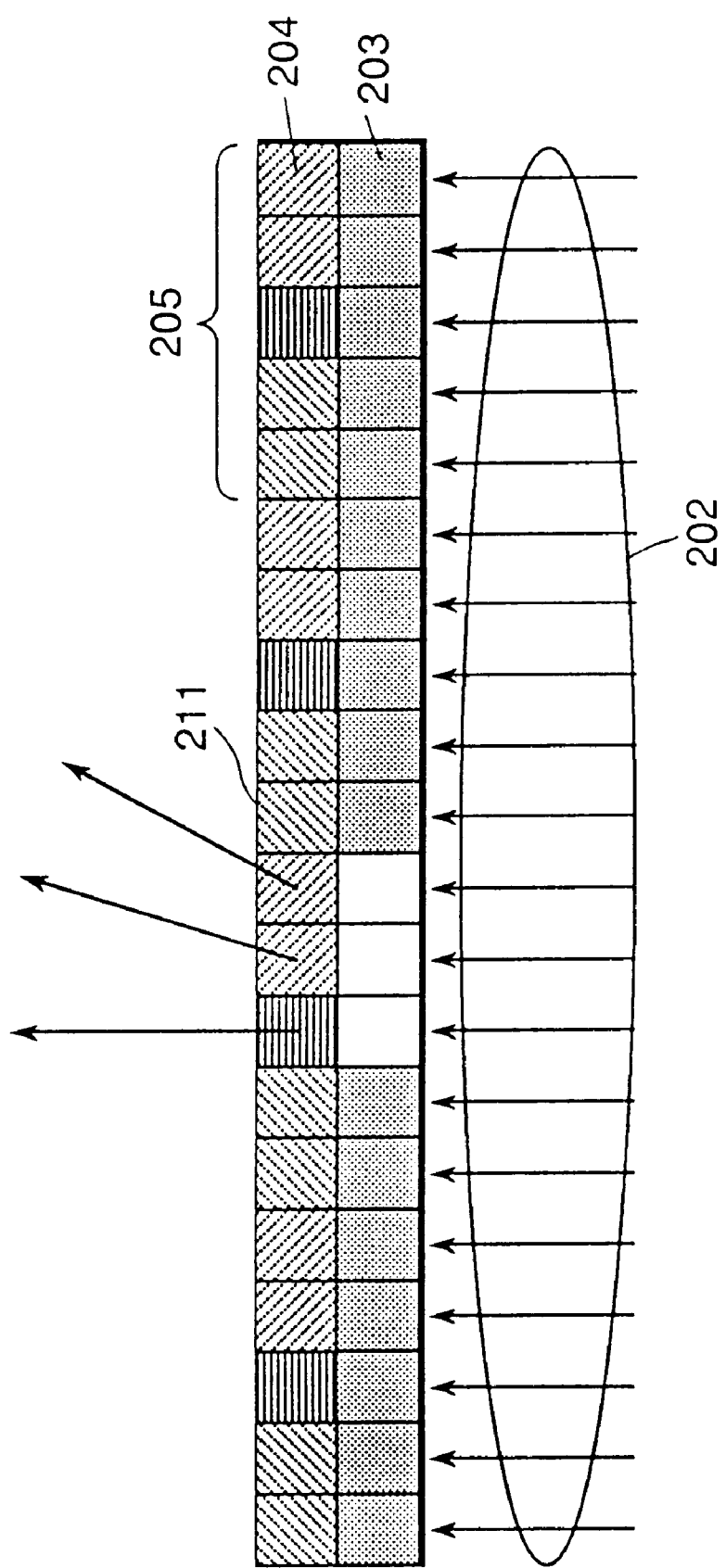
FIG. 16 a schematic view of an essential portion of the embodiment shown in FIG. 15, which uses a liquid crystal display panel.

The moving flat screen 211 is of transmission (Fresnel) type (not of reflection (Lippmann) type used in the first embodiment). The liquid crystal panel is capable of modulating the intensity of laser light for each pixel. As shown in FIG. 16, a pitch of pixels of the liquid crystal panel 203 is identical to a pitch of diffraction elements arranged in the moving flat screen 211. The liquid crystal panel 203 is integrally overlaid on the moving flat screen 211 in such a way that its pixels may correctly match with the diffraction elements of the screen.

The liquid crystal panel 203 is desired to have a large aperture number. With laser radiation 202, the liquid crystal panel 203 modulates intensity of the laser beam by pixels selected under control of the control computer so that the screen diffraction elements corresponding to the selected pixels are illuminated with laser light of the desired intensity.

As described above, this embodiment can display three-dimensional image by illuminating only necessary diffraction elements without scanning laser beam.

Third embodiment:

The first embodiment and the second embodiment control illumination by laser light from the laser light source by changing illuminating position and modulating intensity of illuminating light respectively, whereas this embodiment is featured by directly modulating the intensity of laser light for each pixel by changing current to be supplied to light-emitting elements of light-emitting diode array or semiconductor laser array made integrally with a moving flat screen. This embodiment is described below in details.

Figure 17:
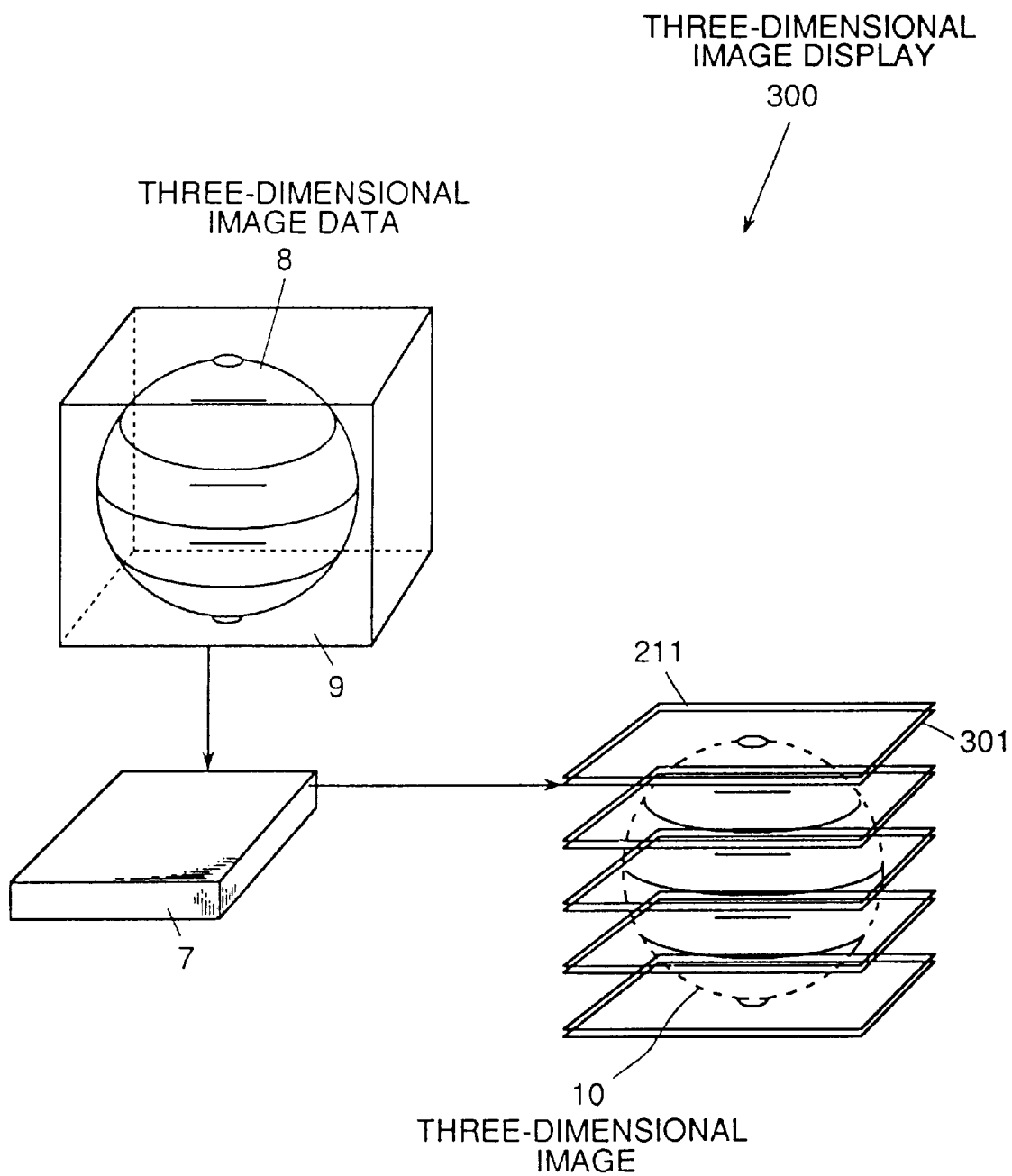
FIG. 17 is a schematic view showing a three-dimensional image display device which is based on appearance modulation and which is an embodiment of the present invention.

FIG. 17 is a construction view of a three-dimensional image display embodying the present invention. A moving flat screen 211 consists of transmission (Fresnel) type diffraction elements.

The moving flat screen 211 is made integrally with an array of light-emitting elements 301. A pitch of light-emitting elements in the array 301 is identical to a pitch of diffraction elements arranged in the moving flat screen 211. The light-emitting element array 301 is integrally overlaid on the moving flat screen 211 in such a way that its pixels may correctly match with the diffraction elements of the screen.

Every element of the light-emitting element array 301 is provides with a collimating lens to form parallel beams from the light-emitting element array.

Figure 18:
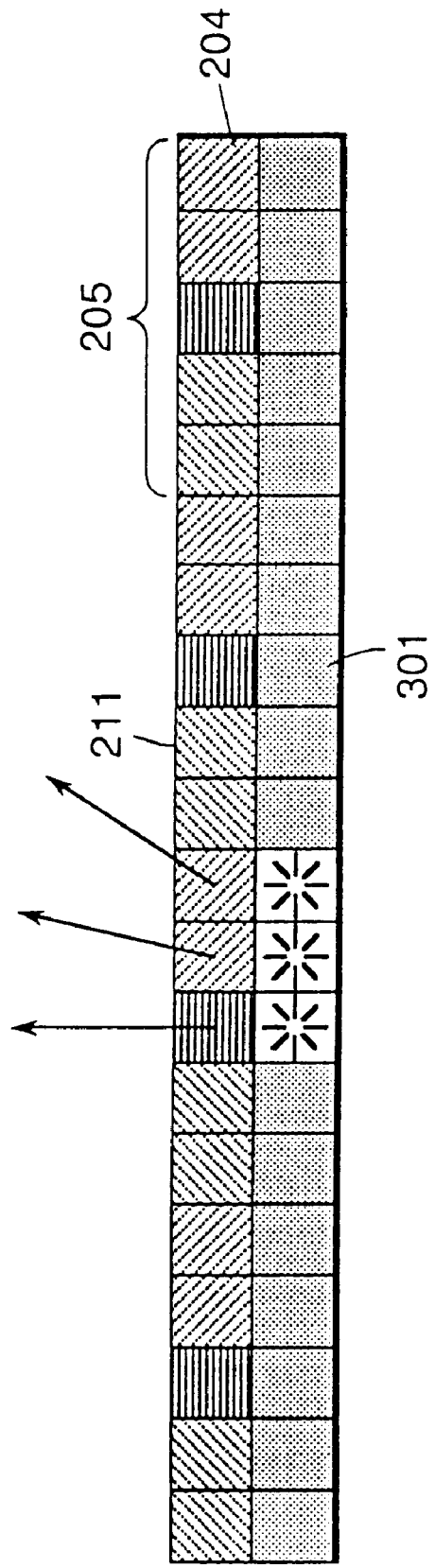
FIG. 18 a schematic view of an essential portion of the embodiment shown in FIG. 17, which uses an array of light-emitting elements.

FIG. 18 is a sectional view of a unit composed of a moving flat screen 211 and a light-emitting element array 301. The control computer 7 for controlling light-emitting elements selects diffraction elements 204 of a pixel 205 and supplies electric current to light-emitting elements corresponding to the selected diffraction elements 204 so that only the diffraction elements corresponding to the selected pixels may be illuminated by laser light of the desired intensity to display a three-dimensional image.

Fourth embodiment:

The first embodiment, uses a moving flat screen consisting of reflection (Lippmann) type diffraction elements, which can be manufactured by recording interference pattern formed by two beams on light-sensitive material. It may also use a moving flat screen consisting of reflection (Fresnel) type diffraction elements with a metal (e.g., aluminum) film deposited thereon. The second and third embodiments preferably use a moving flat screen consisting of transmission type Fresnel diffraction elements which are suitable for mass production at a low cost.

Figure 19:
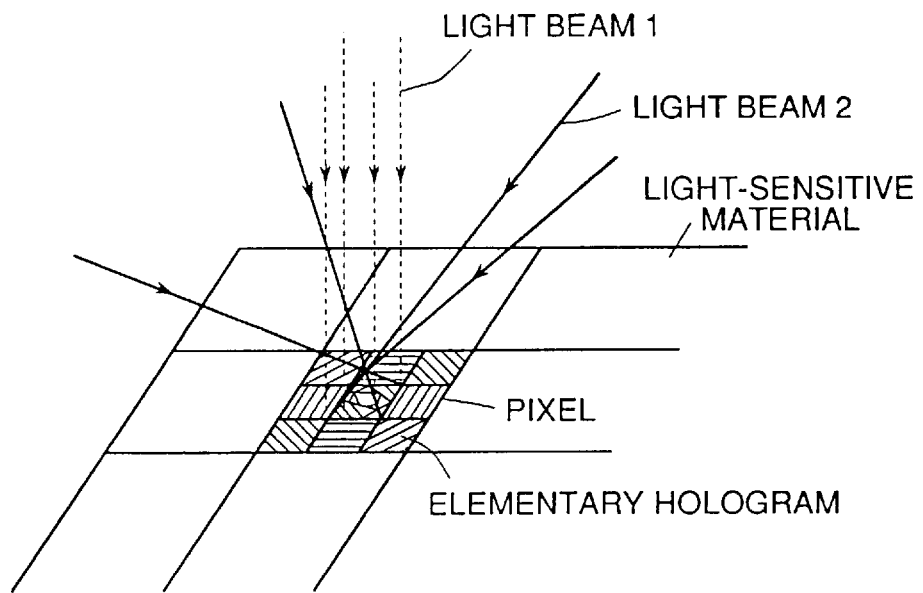
FIG. 19 is a view for explaining a method for preparing Fresnel type hologram elements usable in an embodiment of the present invention.

Fresnel type holograms for use in the fourth embodiment will be explained below referring to the accompanying drawings:

Referring to FIG. 19, a Fresnel type elementary hologram is prepared by splitting a beam of coherent light in two beams 1 and 2, converting the beam 1 to parallel beam and the beam 2 to divergent beam and bring both beams onto the same area on a light-sensitive material to form and record an interference pattern thereon.

In FIG. 19, there is shown a pixel consisting of 9 (3 by 3) holograms, indicating a center elementary hologram of the pixel being prepared by interference of two beams. In this case, the divergence angle of the divergent beam determines a viewing area (field) of reproduced light by the elementary hologram.

Other elementary holograms are also prepared by bringing two beams onto the light-sensitive material from the same side but in different incident directions. For example, the top left hologram is formed with a divergent beam falling thereto from the front right direction, while the front left hologram is formed with a divergent beam falling thereto from the top right direction.

An elementary hologram panel (screen) is prepared by repeating the above-mentioned process for recording 9 elementary holograms composing one pixel on the light-sensitive material of the panel. All elementary holograms are then developed and finally fixed on the light-sensitive material of the screen.

Figure 20:
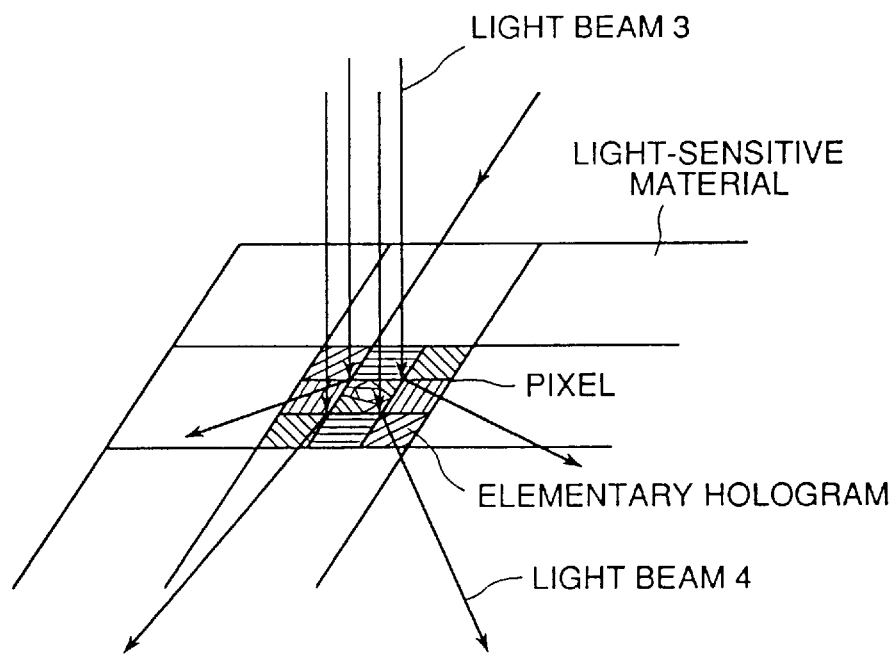
FIG. 20 is a view for explaining a method for reproducing Fresnel type hologram elements usable in an embodiment of the present invention.

Reproducing the Fresnel type holograms is effected as follows:

To reproduce the recorded image, desired elementary holograms are illuminated by parallel light 3 having the same wavelength that the original hologram producing beam has (see FIG. 20).

The hologram reproducing beam has the same wave front that the original hologram producing beam 2 has. Therefore, the holograms are reproduced as divergent light at opposite side of the light-sensitive material to the parallel incident beams 3. Although the embodiment is described with vertical incident beams 1 and 3 to the light-sensitive material, slant incident beams are also applicable.

These elementary holograms can be modified to reflecting type diffraction elements by depositing a reflecting metal film (e.g., aluminum) thereon.

Other kinds of applicable diffraction elements are, for example, diffraction elements made by drawing computer-designed hologram on the plate by electron beam or laser beam and diffraction elements made by binary optics technology.

These diffraction elements can be of surface relief type and, therefore, can be manufactured in a large quantity at a low cost by the embossing technology.

Next, the Fresnel type diffraction elements, which can be made integrally with a moving flat screen by using an electron beam drawing machine or the like, will be described in respect to their grating constant and ruling direction.

Figure 21:
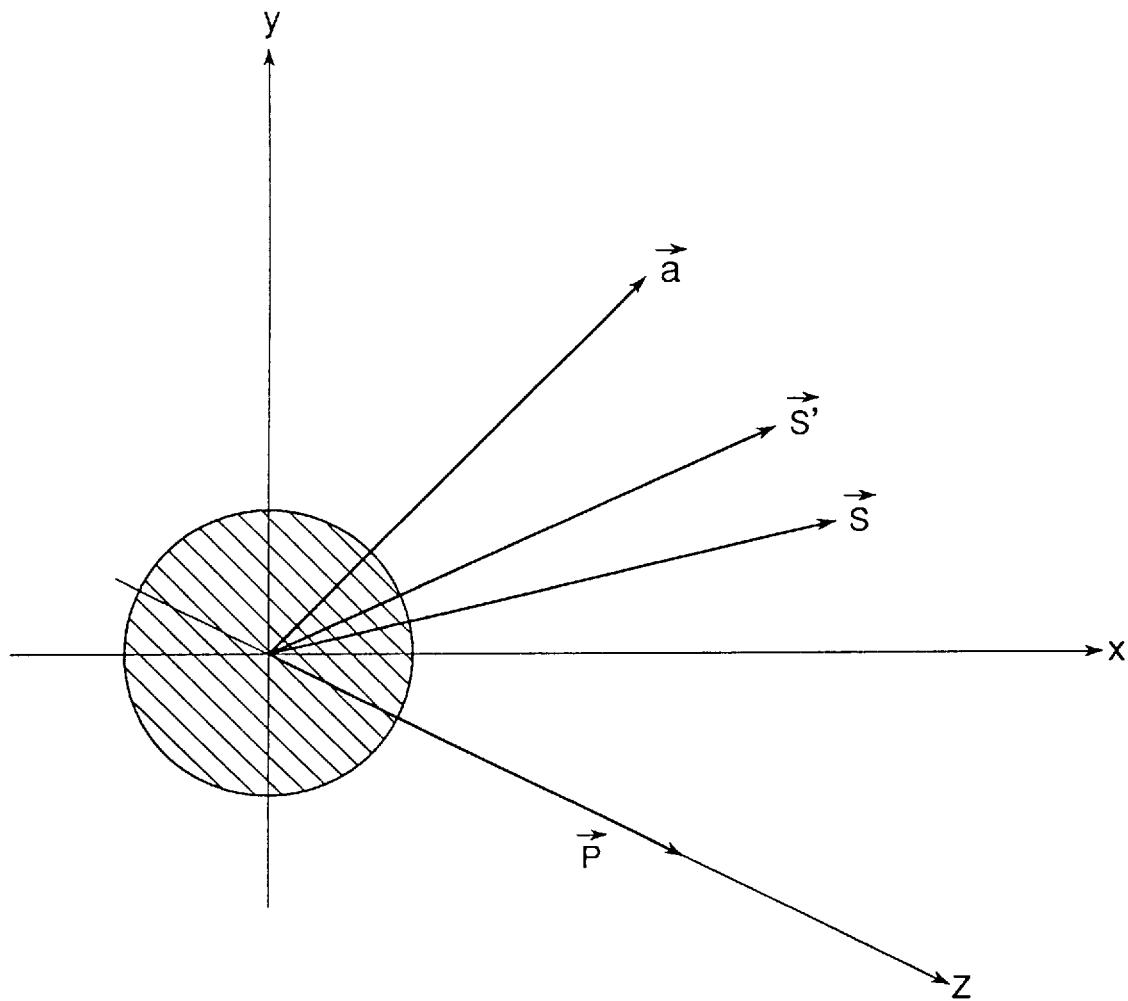
FIG. 21 is a view for explaining a relation between a diffraction element and light.

FIG. 21 shows relative positions of one diffraction element and a beam of light. The diffraction element is laid in an X-Y plane of space of three-dimensional (xyz) coordinates. (A unit vector of a normal to the grating surface has the same direction as positive direction of Z-axis.) The ruling direction is expressed by a unit vector a that is normal to ruling of the diffraction grating within the grating surface ($\vec{a}$ exists in the X-Y plane).

The vector $\vec{a}$ is supposed to form an angle r to x-axis. Propagating directions of incident light and diffracted light in diffraction elements are indicated by unit vectors $\vec{s}$ and $\vec{s}'$ of the normals of respective plane waves. With a degree m of the diffracted light, the propagating direction ($\vec{s}'$) of the diffracted plane wave is represented as follows:

$$\vec{s}' = \vec{s} + (m \times \lambda/d)\vec{a} \qquad (1)$$

Figure 22:
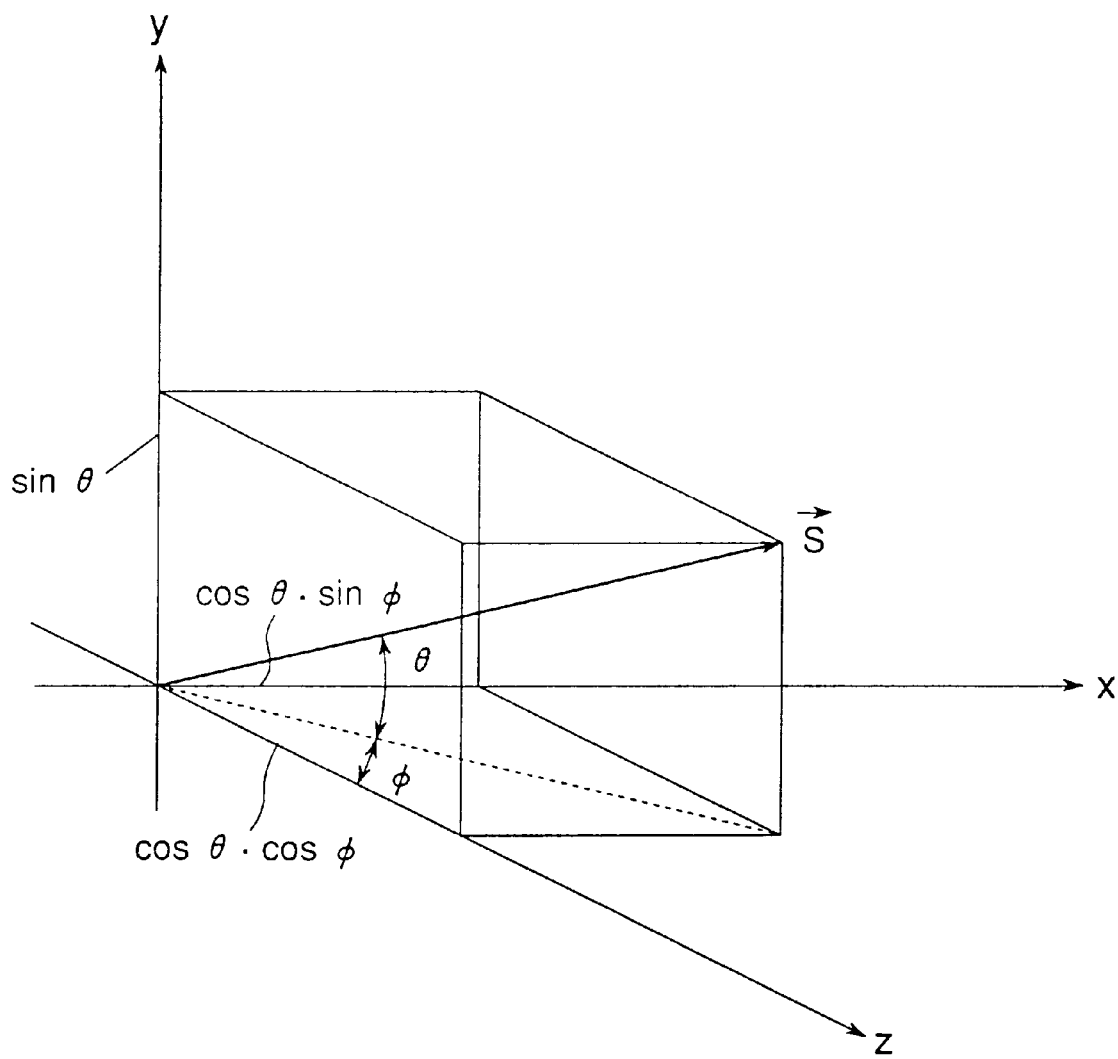
FIG. 22 is a view for explaining a vector representation of diffraction light in a polar coordinates system.

Referring to FIG. 22, these vectors are expressed in terms of vector components in polar coordinates (θ, φ) system as, for example, $\vec{s}$ =(cos θ×sin φ, sin θ, cos θ×cos φ). Coordinate variables θ and φ are used for vector $\vec{s}$, and coordinate variables θ' and φ' are used for vector $\vec{s}'$.

By substituting vector components for $\vec{s}'$ and $\vec{a}$ in Equation (1), values d and γ are calculated according to Equations (2) and (3) respectively. (m=1 because +1 dimensional diffracted light is used in this embodiment.)

$$d = \lambda/\sqrt{(\sin\theta' - \sin\theta)^2 + (\cos\theta' - \cos\theta\sin\phi)^2} \qquad (2)$$

$$\gamma = \tan^{-1}[(\sin\theta' - \sin\theta)/(\cos\theta'\sin\phi' - \cos\theta\sin\phi)] \qquad (3)$$

To propagate incident light in the direction $\vec{s}$ =(cos θ×sin φ, sin θ, cos θ×cos φ) and diffracted light in the direction $\vec{s}'$ =(cos θ'×sin φ', sin θ', cos θ'×cos φ'), the diffraction element disposed in a X-Y plane of space of three-dimensional (xyz) coordinates may have a grating constant d determined by Equation (2) and a ruling direction γ determined by Equation (3).

A diffraction element that has a widen viewing area may be obtained by multi-recording suitably sampled values d and γ corresponding to ranged values θ' and φ' on the same area on a substrate. It is also possible to use such a diffraction element that is obtained by engraving lines on a substrate so that values d and γ continuously vary in the respective ranges corresponding to the ranges of values θ' and φ'.

Fifth embodiment:

The first embodiment using a moving flat screen composed of Fresnel type diffraction elements and the second and third embodiments were described in such a manner that diffraction elements composing a moving flat screen is illuminated by incident light falling vertically thereto.

Figure 24:
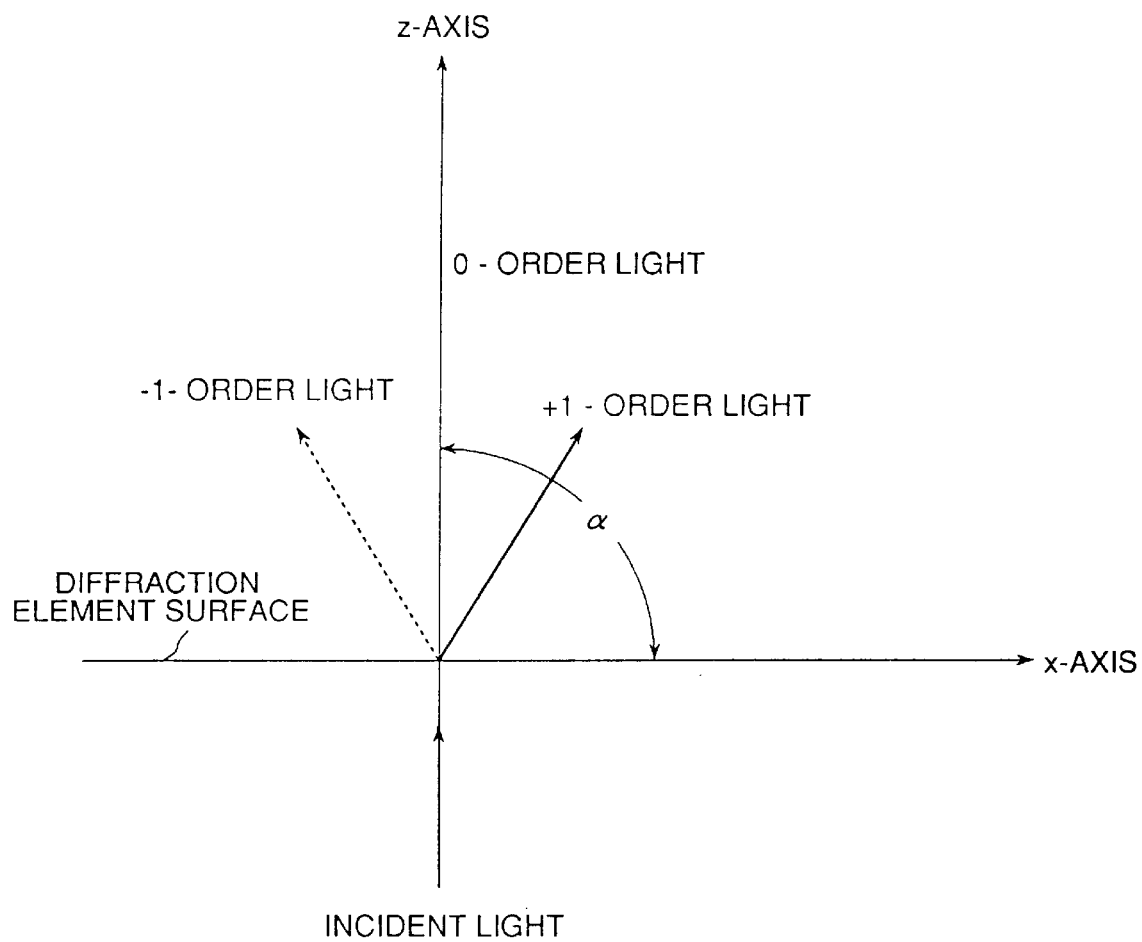
FIG. 24 is a view for explaining a relation between incident light and diffraction light.

As shown in FIG. 24, any diffraction element may usually produce, besides positive +1-order beams, 0-order beams, -1-order and higher dimensional beams. All diffracted beams except the +1-order diffracted beams are unnecessary for the three-dimensional image display according to the present invention. They may be, therefore, shut-off at the displaying surface side of the moving flat screen.

Figure 23:
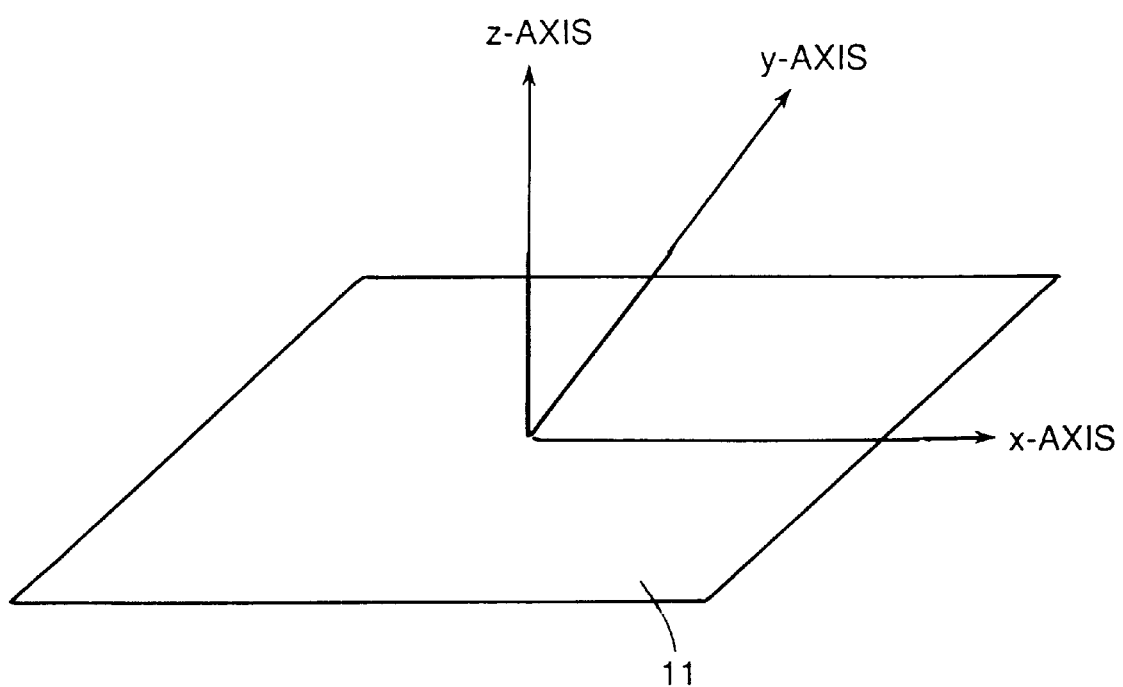
FIG. 23 is a view for explaining how to locate a position with coordinates of a moving flat screen 11.

Those unnecessary diffracted beams narrow the area in the diffracting direction of +1-order light. Namely, when incident light vertically (at 90) strikes the moving flat screen 11 composed of diffraction elements and three-dimensional coordinates are taken relative to the screen as shown in FIG. 23, the 0-, +1- and -1-order diffracted beams get out in the directions shown in FIG. 24.

Therefore, the diffracting direction of the +1-order light is limited to an angle α of 90° between the zero-dimensional beam and the X-axis. In other words, the viewing area angle of the three-dimensional image display is limited to 90°.

Figure 25:
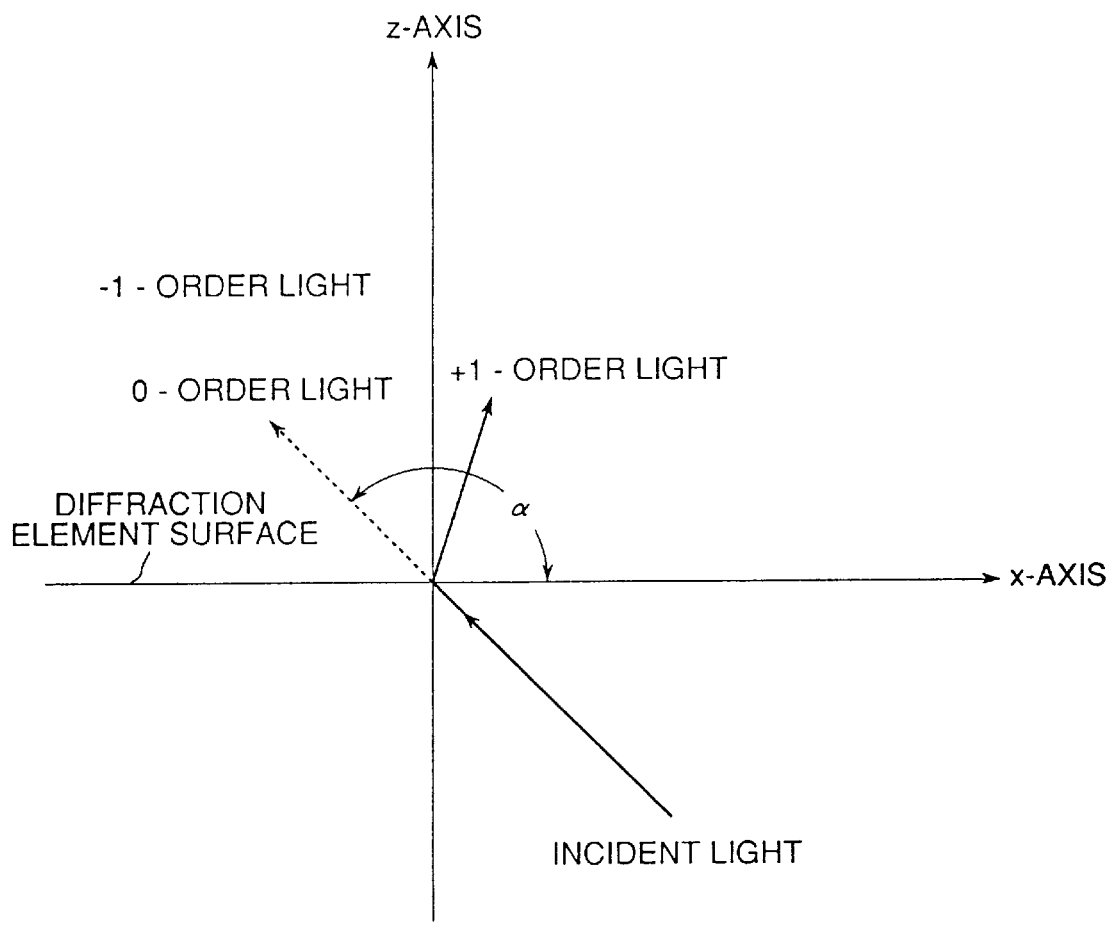
FIG. 25 is a view showing an embodiment using slant incident light.
Figure 26:
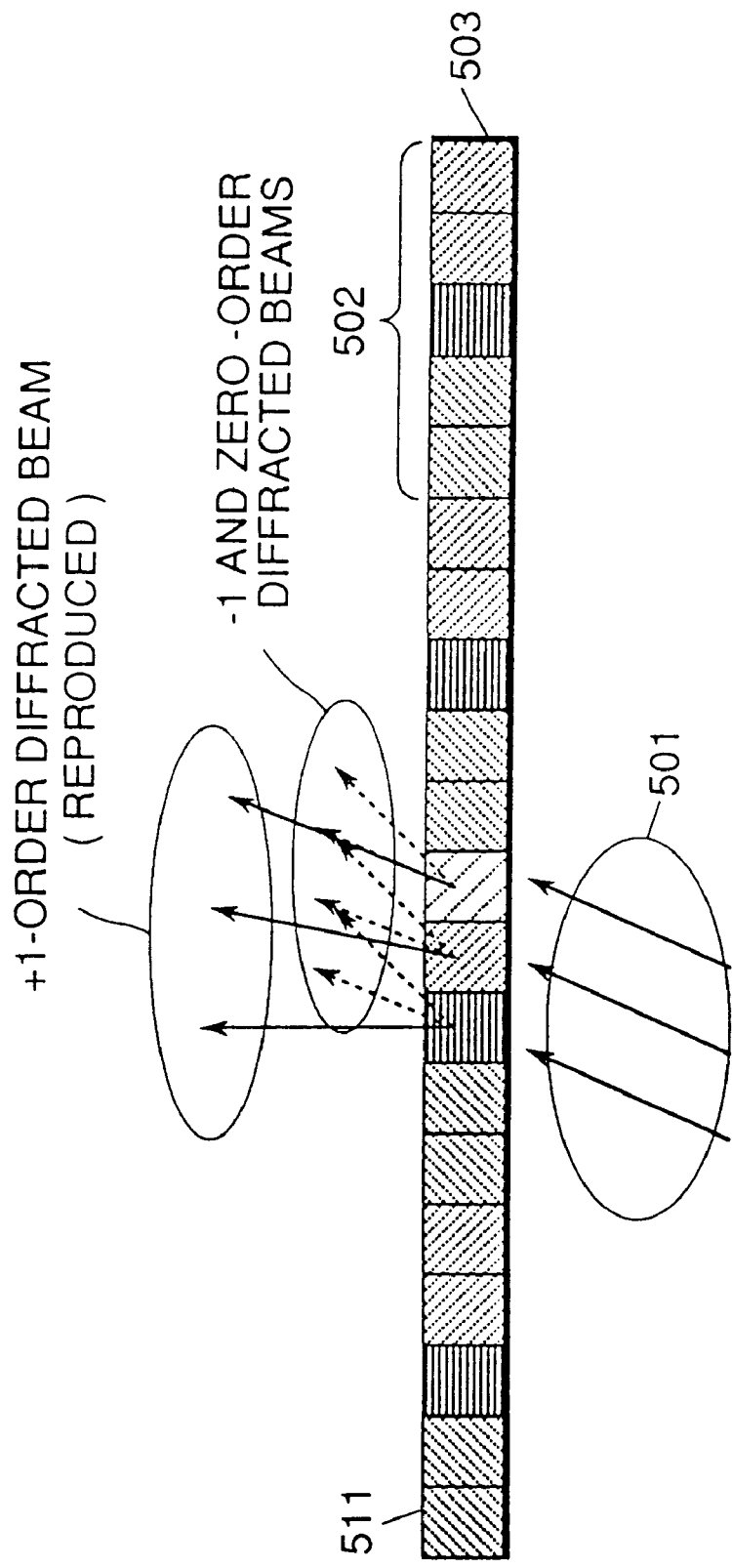
FIG. 26 is a view for explaining the operation of an embodiment of the present invention, wherein slant incident light is applied to a diffraction element screen.

Accordingly, the above-mentioned limit of the diffracting direction for the +1-order light can be relaxed by changing the incidence angle of light to the diffraction elements (moving flat screen) to (90°-α) as shown in FIG. 25. In this case, the incident light 501 is diffracted as it passes through the diffraction elements 503 composing the moving flat screen 511: +1-order refracted light is separated from the zero- and -1-order beams and forms a wide-angle three-dimensional image as shown in FIG. 26.

Sixth embodiment:

The fifth embodiment has a viewing area widened by slanting incident light to the moving flat screen. The sixth embodiment relates to means for realizing the above-mentioned feature.

To obtain slant incident light entering at an angle a moving flat screen composed of Fresnel type diffraction elements in the first, second and third embodiments of the three-dimensional image display devices, it is necessary to scan the screen with laser light 6 by using an X-Y deflector 5 and projecting lens 12 both disposed in a deflected direction. However, the movement of the moving flat screen 11 broadens a scanning area of the laser light 6 and makes selective control of the diffraction elements by laser light scanning be difficult.

Figure 27:
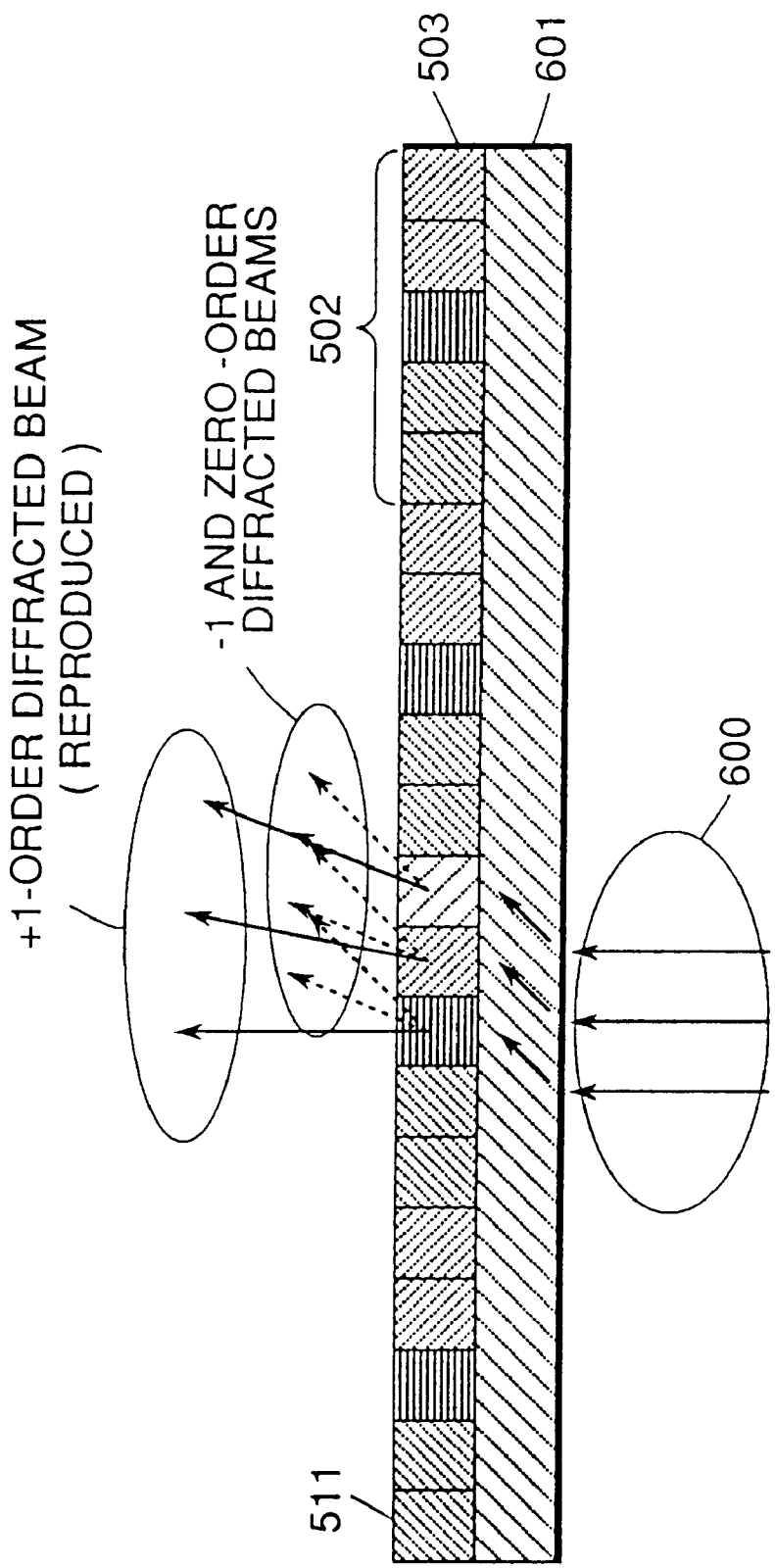
FIG. 27 is a view for explaining the operation of the embodiment of FIG. 26, which, however, uses an optical fiber waveguide for slanting incident light.

To solve the above-mentioned problem, as shown in FIG. 27, an optical fiber waveguide 601 is attached to the incident light side of the moving flat screen 511 to bend the direction of propagation of incident light 600. Namely, incident light vertically entering the optical fiber waveguide 601 through which it may enter slant to the diffraction elements 503 with a result of widening the outgoing area of +1-order diffracted light. Light entered the optical fiber waveguide is tilted relative to the axis of the latter and therefore propagates therein repeatedly reflecting from the waveguide core-cladding interface.

Figure 28:
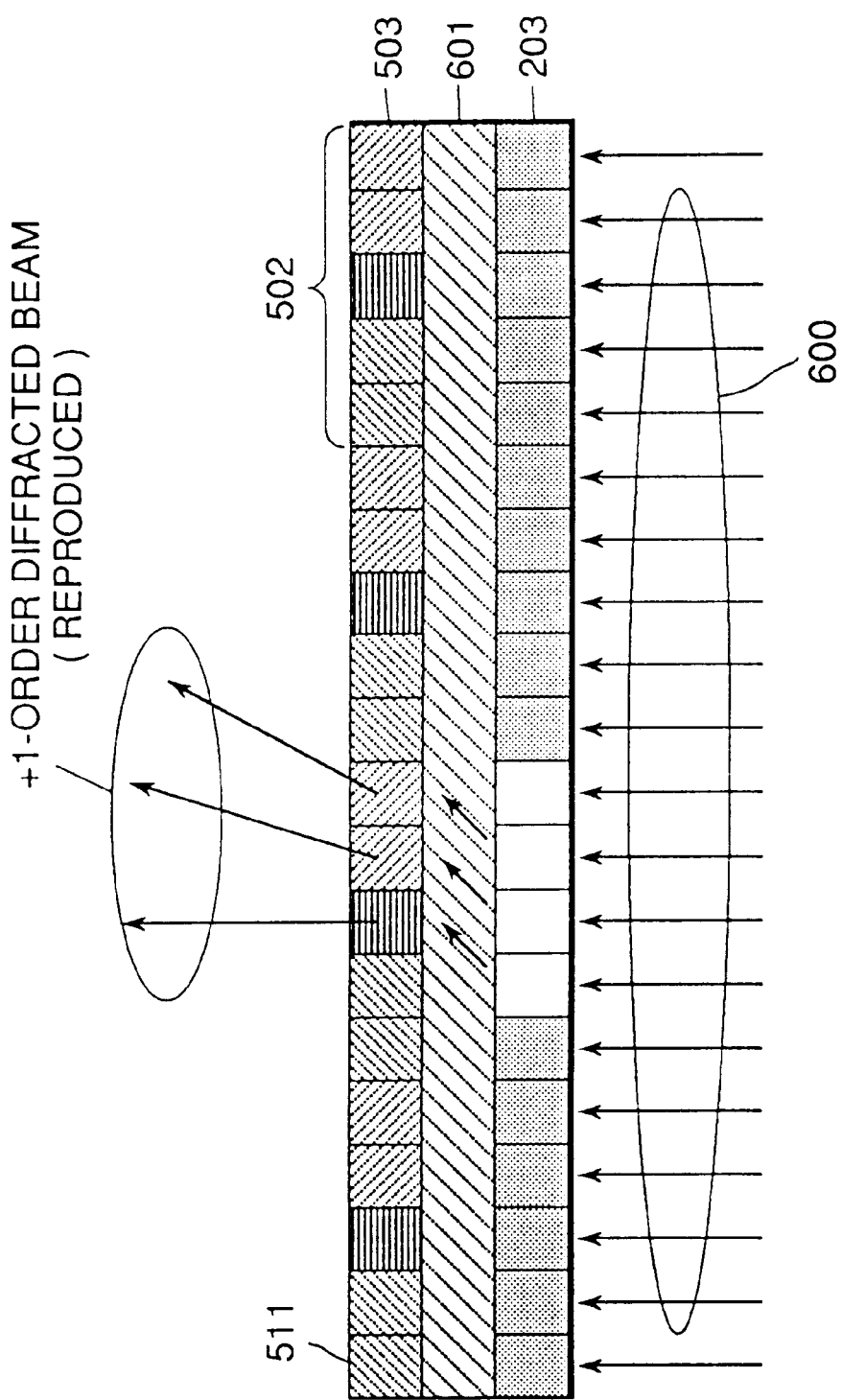
FIG. 28 is a view showing the embodiment of FIG. 16, which uses an optical fiber waveguide for slanting incident light.
Figure 29:
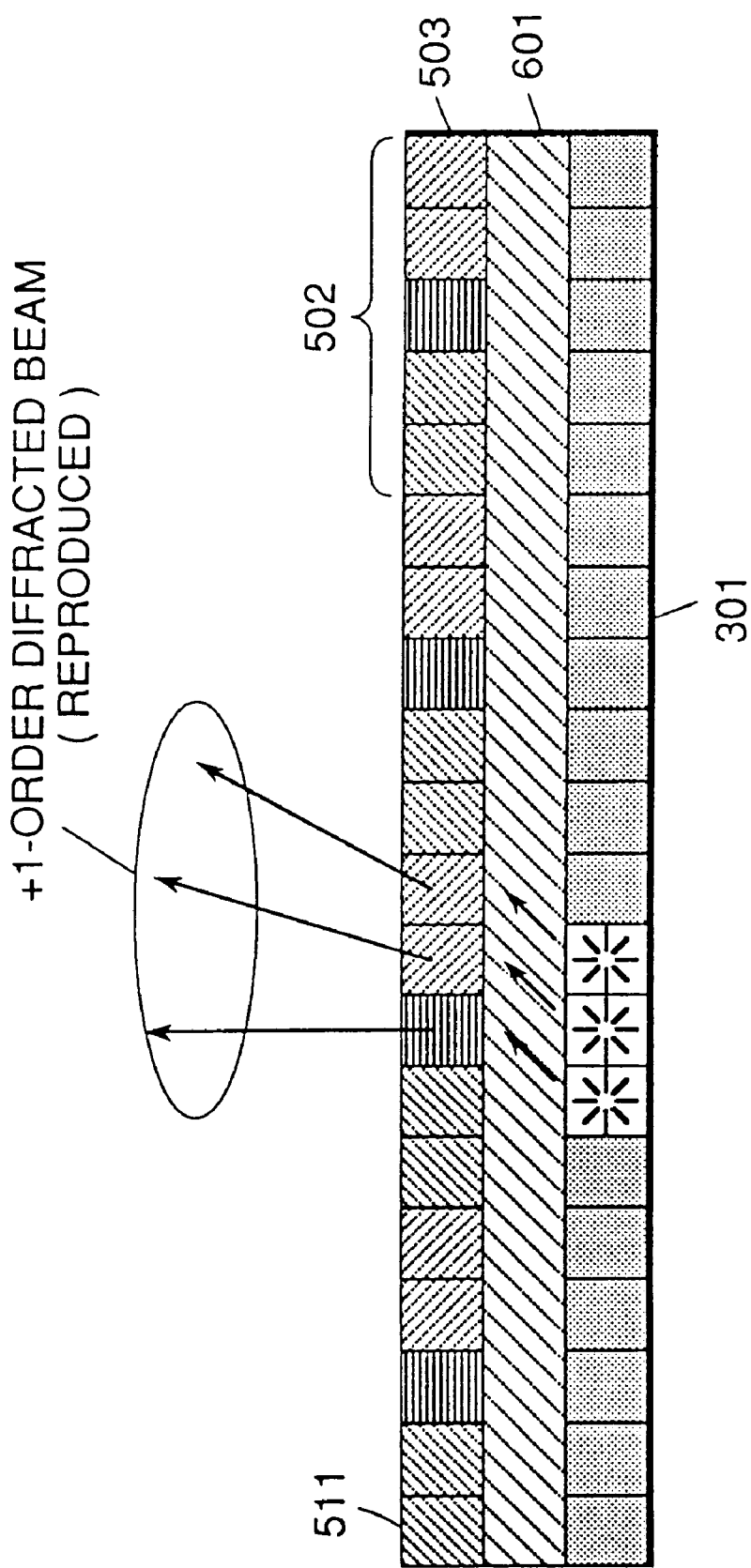
FIG. 29 is a view showing the embodiment of FIG. 18, which uses an optical fiber waveguide for slanting incident light.

In the second and third embodiments, the three-dimensional image display devices may have a wide viewing area by providing their moving flat screens with an optical fiber waveguide capable of separating +1-order diffracted light from -1-order and 0-order diffracted beams as shown in FIG. 28 and FIG. 29.

In this instance, the moving flat screen 511, the optical fiber waveguide and a liquid crystal panel 203 or a light-emitting element array 301 are desirably united together. Any light-bending means other than the above-mentioned optical fiber waveguide may be also applicable.

Seventh embodiment:

This embodiment elates to a three-dimensional display device which is based on the first embodiment with a Fresnel diffraction element type moving flat screen or base on the second or the third embodiment and which is featured in that its moving flat screen is composed of blazed diffraction elements.

The blazed diffraction elements are used for increasing diffraction efficiency by obtaining propagation of +1-order light in the same direction as reflection or refraction of light at the diffraction element surface.

The provision of the three-dimensional display with a moving flat screen having the blazed diffraction elements can produce a bright image with an increased light transmission efficiency.

Figure 30:
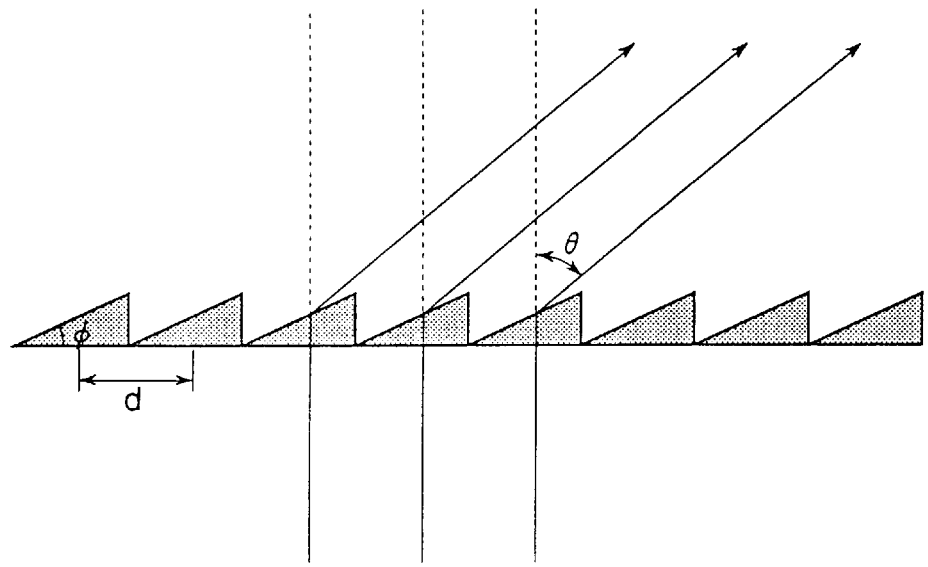
FIG. 30 is a view for explaining the operation of a transmission type blazed diffraction element.

The three-dimensional display device which is based on the first embodiment with a moving flat screen composed of Fresnel type transmission diffraction elements or based on the second or the third embodiment and which is featured in that its moving flat screen is composed of blazed diffraction elements will be explained first as follows:

FIG. 30 shows that a diffraction element having a blaze angle φ and a grating factor d bends a plane wave of vertical upward incident light at a deflection angle θ. (The angles φ and θ are different in meaning from those used in the fourth embodiment.)

Figure 31:
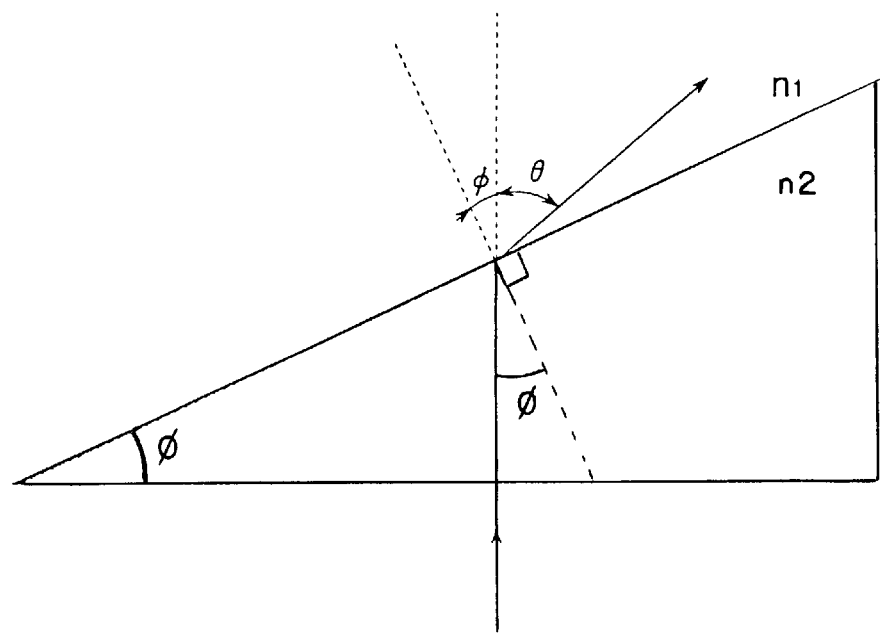
FIG. 31 is a view for explaining in detail the operation of a transmission type blazed diffraction element.

FIG. 31 shows the refraction of light on a ruled surface composing a diffraction element.

As be seen from FIG. 30, a relation between an incidence angle and angle of +1-order diffracted light can be expressed as follows:

$$\sin \theta = \lambda/d \tag{4}$$

If a refractive index of air is $n_1$ and a refractive index of diffraction element material is $n_2$ in FIG. 31, the following equation is obtained according to the formula of refraction:

$$n_1 \sin \theta = n_2 \sin (\theta + \phi) \tag{5}$$

From Equation (4), the grating constant d can be determined according to the following equation:

$$d = \lambda/\sin \theta \tag{6}$$

From Equation (5), the following equation for determining the blaze angle φ depending on the deflection angle θ is obtained:

$$\phi = \sin^{-1}\left[\sin\theta \bigg/ \sqrt{1 + (n_2/n_1)^2 - (n_2/n_1)\cos\theta}\right] \quad (7)$$

Values that the blaze angle φ, deflection angle θ and grating factor can take are restricted within the following respective ranges by total reflection from an interface between air and diffraction element material when light of wavelength 0.532 μm is refracted from air having the refractive index $n_1$ of 1 into a diffraction element made of, e.g., glass having a refractive index $n_2$ of 1.5:

0≦φ≦41.8°
0≦θ≦48.2°
d≧0.71 μm

The deflection angle θ may be thus to some degree limited. But, the moving flat screen may be so designed that a number of diffraction elements determined by Equations (6) and (7) are arranged thereon by changing their grating constant d and blaze angle φ corresponding to the deflection angle θ within the above-mentioned limited range not to allow zero-order light. The three-dimensional display provided with the thus constructed moving flat screen may represent a three-dimensional image with an increased efficient of using light.

Figure 32:
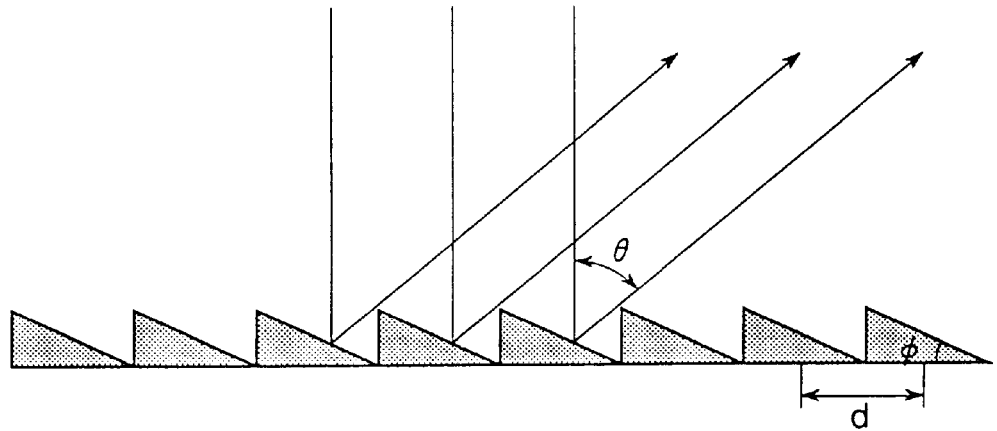
FIG. 32 is a view for explaining the operation of a reflection type blazed diffraction element.
Figure 33:
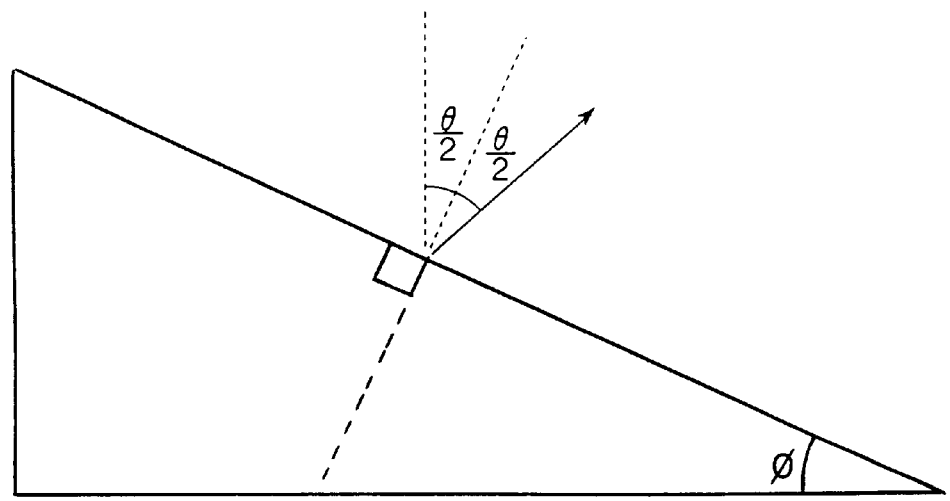
FIG. 33 is a view for explaining in detail the operation of a reflection type blazed diffraction element.

The first embodiment of the three-dimensional image display with a moving flat screen composed of Fresnel reflection type diffraction elements will be described below:

FIG. 32 shows plane waves of incident light vertically fallen and reflected at a deflection angle θ by diffraction elements having a blaze angle φ and a grating factor d. FIG. 33 shows the reflection of light on a ruled surface composing a diffraction element.

As be seen from FIG. 32, a relation between an incidence angle and angle of +1-order diffraction has the following expression:

$$\sin\theta = \lambda/d \quad (8)$$

From FIG. 33, the following equation is obtained according to the formula of refraction:

$$\theta/2 = \phi \quad (9)$$

From Equation (8), the grating constant d can be determined according to the following equation:

$$d = \lambda/\sin\theta \quad (10)$$

From Equation (9), the following equation for determining the blaze angle φ depending on the deflection angle θ is derived:

$$\phi = \theta/2 \quad (11)$$

Values that the blaze angle φ, deflection angle θ and grating factor can take are restricted within the following respective ranges:

0≦φ≦90°
0≦θ≦45°0

Grating factor d can take any desired value.

By using the moving flat screen that has a number of blazed diffraction elements determined by Equations (10) and (11) arranged thereon by changing their grating constant d and blaze angle φ corresponding to the deflection angle θ within the above-mentioned limited range it is possible to provide a three-dimensional display capable of representing a three-dimensional image with an increased efficient of using light with no zero-order light.

The process for preparing the above-mentioned brazed diffraction elements is as follows:

FIG. 34 illustrated the process for manufacturing blazed diffraction grating, which process consists of (A) photoresist coating, (B) exposing, (C) developing, (D) blaze processing and (E), (F) replica processing steps.

At the photoresist coating step (see FIG. 34(A)), a thin film of photoresist is first applied onto a glass substrate polished to an accuracy of wavelength level and is then pre-baked.

At the exposing step (see FIG. 34(B)), an interference pattern is formed by two laser beams on the photoresist layer of the substrate through an interference optical system which is arranged so that the distance between lines of an interference pattern coincides with the grating constant determined by Equation (6) or (10).

The exposed substrate is converted by developing to have a pattern of grating grooves having a semi-sinusoidal cross-section (see FIG. 34(C)).

At the blaze processing step (see FIG. 34(D)), ion radiation slants onto the substrate to form triangular grooves thereon.

At the replicating step (see FIG. 34(E) and (F)), a negative master is prepared and a replica is produced by embossing.

A reflection type diffraction grating can be prepared by evaporating a thin film of metal such as aluminum on the surface of the prepared blazed diffraction element. The mass production of the moving flat screen is possible since the diffraction element can be easily reproduced by means of replicating technique.

Eighth embodiment:

In this embodiment, a three-dimensional image is broken into a plurality of blocks each of which is traced with light for preparation of the same control data as was obtained in the first embodiment.

Figure 35:
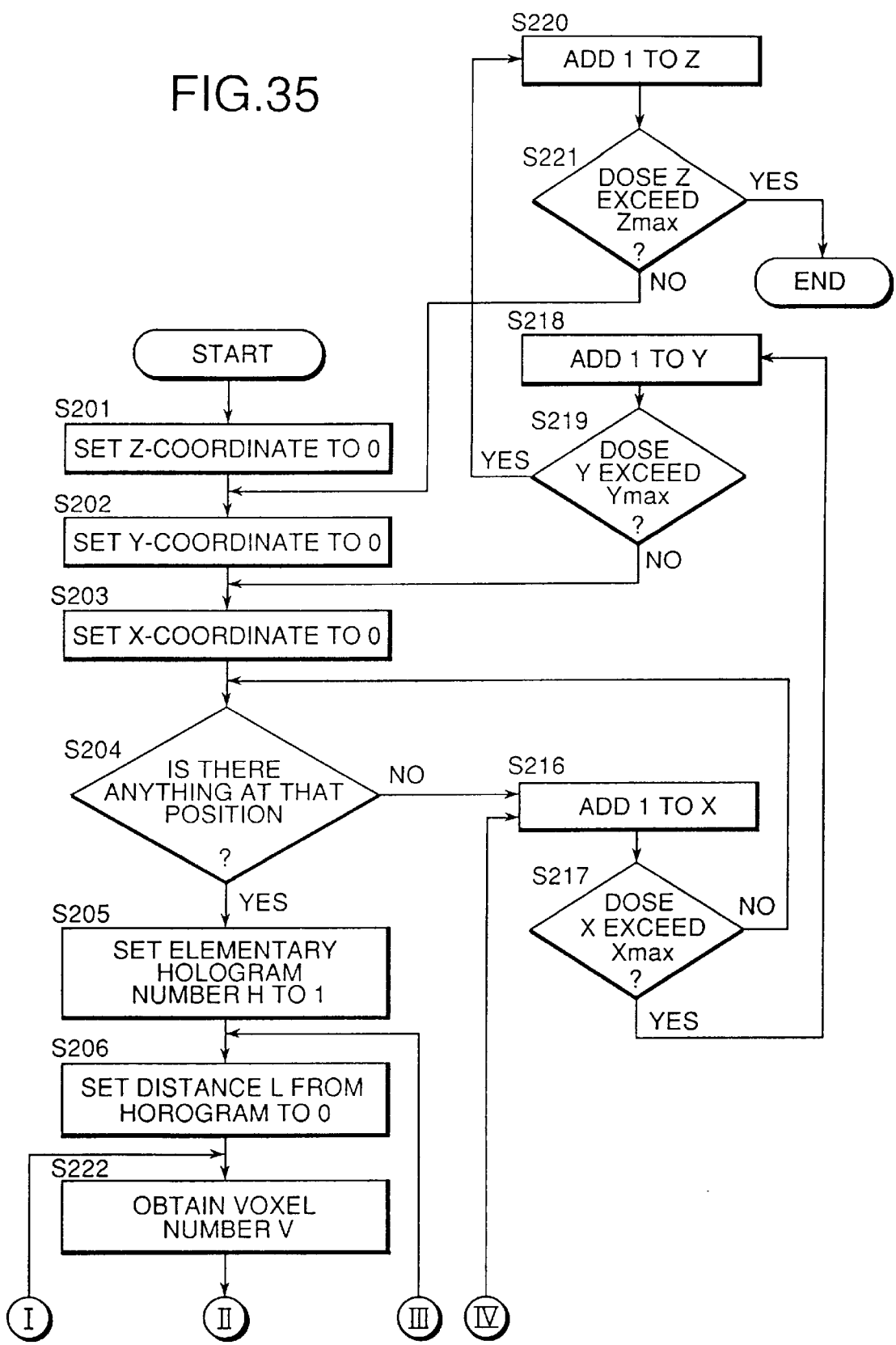
FIG. 35 is a part of flow chart showing a procedure for preparing control data for removing hidden lines and hidden surfaces.
Figure 36:
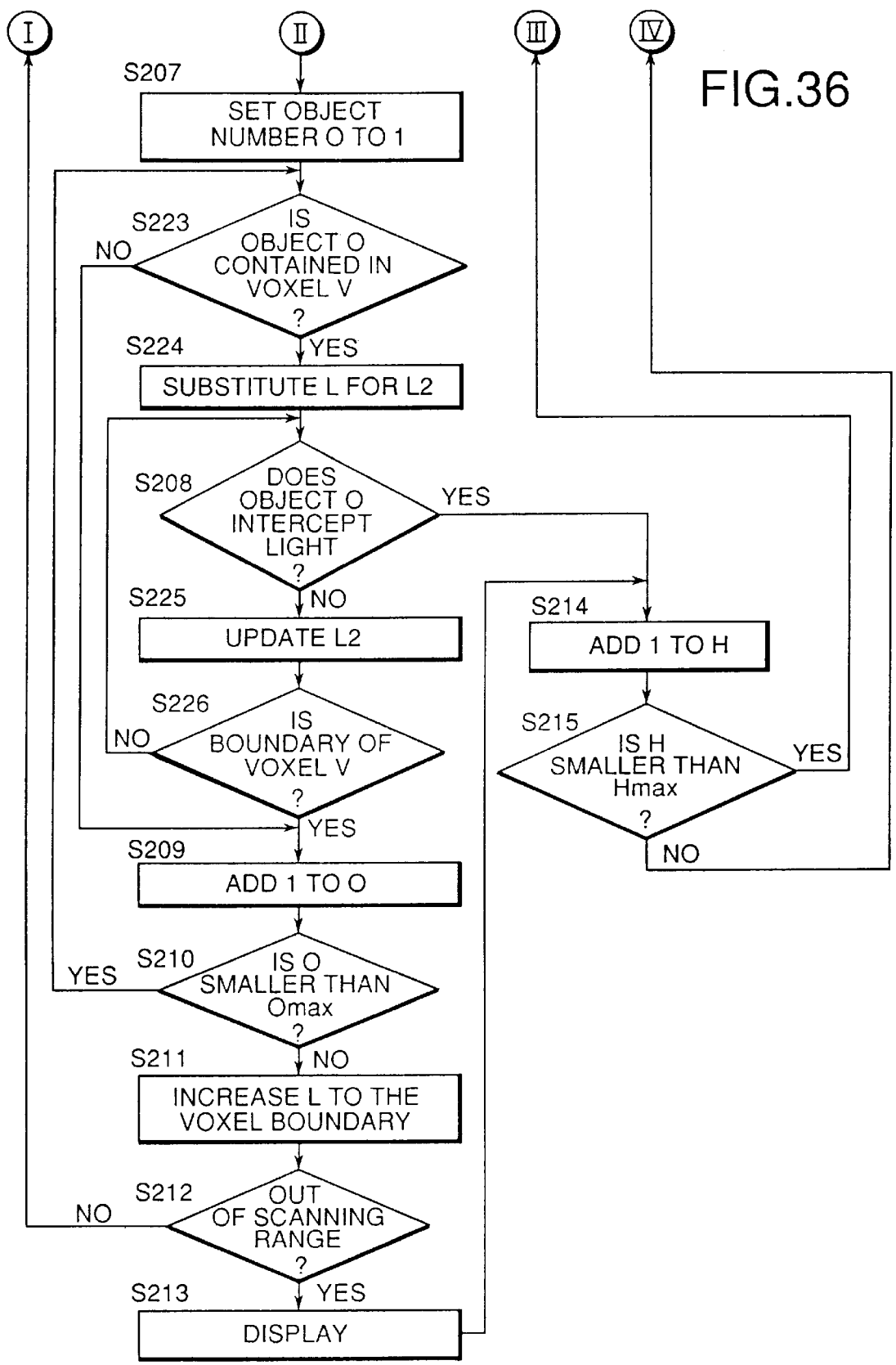
FIG. 36 is a part of flow chart showing a procedure for preparing control data for removing hidden lines and hidden surfaces.

In FIGS. 35 and 36, there is shown a flowchart of a procedure for displaying an image consisting of pixels $X_{max}$ ($X_{max}$=100 in the shown example) in the X-axis direction, pixels $Y_{max}$ ($Y_{max}$=100 in the shown example) in the Y-axis direction and pixels $Z_{max}$ ($Z_{max}$=5 in the shown example) in the Z-axis (depth) direction. Each pixel is composed of elementary holograms $H_{max}$ ($H_{max}$=5×5 in the shown case). FIG. 11 shows objects O1, O2 and O3 to be displayed in an image. The number of objects to be displayed is designated by Omax (Omax=3 in this example).

Figure 37:
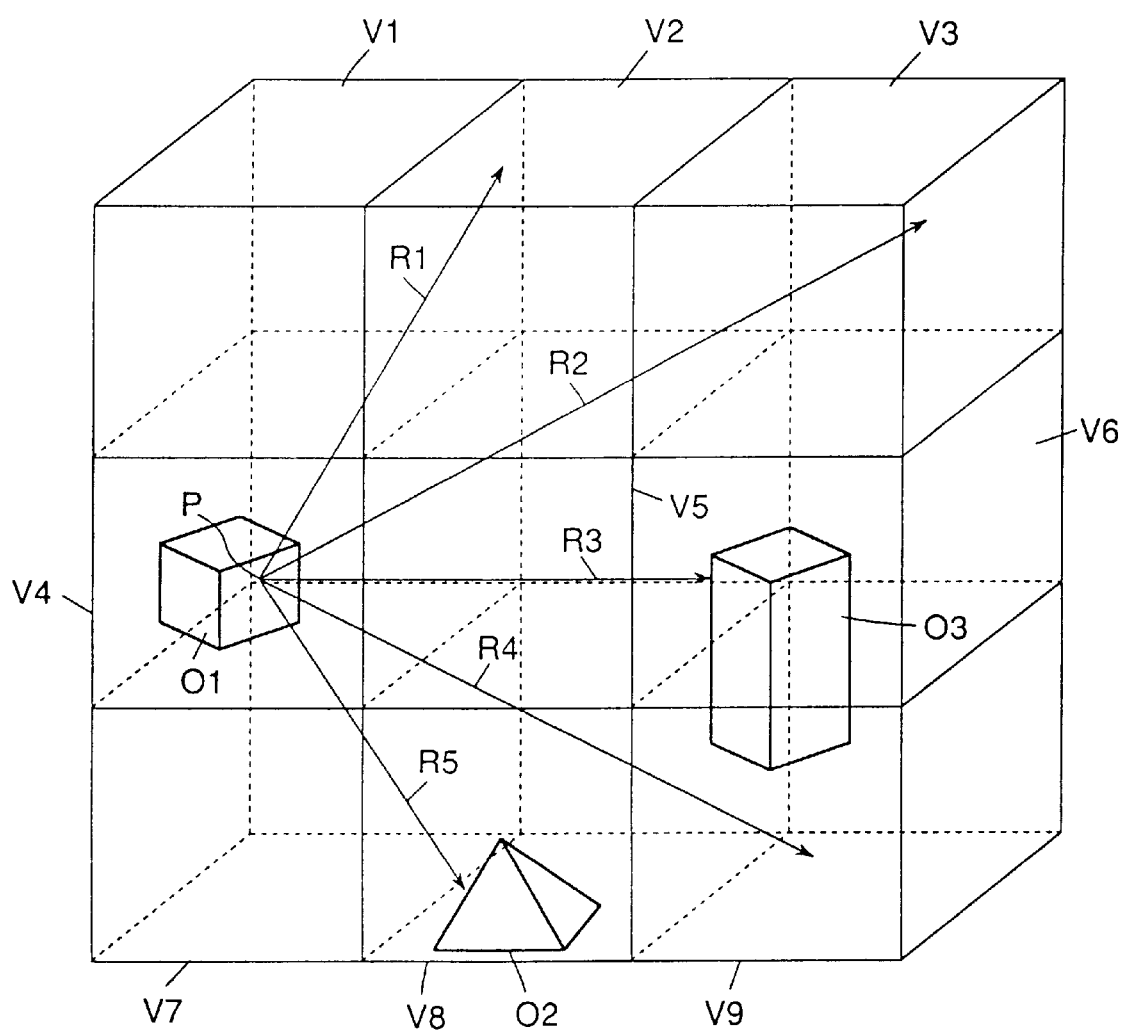
FIG. 37 is a conceptional view representing an exemplified arrangement of a plurality of three-dimensional objects in terms of image data together with segment areas (voxels).

A portion to be displayed is divided into several areas. In this instance, an image of FIG. 11 is divided into 9 voxels (3 rows×3 lines×1 in depth) as shown in FIG. 37. For the sake of explanation, these voxels are given numbers from V1 to V9. The object O1 included in the voxel V4, the object O2 in the voxel V8 and the object O3 in the voxels V6 and V9. The number of voxels is denoted by $V_{max}$ ($V_{max}$=9 in this example).

Referring to FIG. 35 and FIG. 36, a Z-coordinate value is set at 0 (Step S201), a Y-coordinate value at 0 (Step S202) and an X-coordinate value at 0 (Step S203).

Next, operation by pixel is performed in X-, Y- and Z-coordinate directions in turn respectively. At Step S204, check is made to see that an object to be displayed exists at the coordinates on the basis of the image data. If there is no object (i.e., no processing is required), the processing of current pixel is finished and, then, the procedure is advanced to Step S216 for processing the proceeding coordinate. When there is found any object, each of elementary holograms composing the pixel is examined whether it shall be illuminated by laser light or not (Step S205). Elementary holograms in each pixel are previously numbered with serial numbers beginning at 1.

At Step S205, 1 is set in the number H of an elementary hologram. Each elementary hologram has a predetermined diffracting direction. The diffracting direction is somewhat widened. This width is represented by a central direction value. It may be also represented by other direction width. For example, the direction somewhat shifted in vertical direction may be adopted in case if the image is desired to have a parallax in the vertical direction.

In FIG. 7, the diffracting directions of elementary holograms (of each pixel) are indicated by diffracted laser beams 30. A distance L from an elementary hologram is set along the diffracting direction.

At Step S206, L is set at 0.

The objects to be displayed are previously numbered with serial numbers beginning at 1.

At Step S222, a number of a voxel containing the coordinates of the position at the distance L is obtained.

At Step S207, the object number O is set at 1.

At Step S223, check is made to see that the object O exists in the voxel.

The processing proceeds to Step S224 if light from the elementary hologram is intercepted thereat. It is branched to Step S209 if the light is not intercepted thereat.

Processing operations from and after Step S224 are intended to examine whether light from the elementary hologram is not intercepted thereat. L2 is substituted by L.

At Step S208, check is made to see there is the object O at the coordinate position at distance L2 from the elementary hologram, referring to the image signal. If the light from the coordinate position of elementary hologram is intercepted thereat, the processing advances to Step S214. With no interception of the light, the processing branches to Step S225.

At Step S225, the distance L2 is updated to the proceeding position (coordinate) to examine the proceeding position by light tracing.

At Step S226, check is made to see that the position of the updated result is within the current voxel. If so, the processing returns to Step S208. The updated result exceeding the current voxel, the processing advances to Step S209 to see a proceeding object.

At Step S209, the object number O is increased by 1 to examine a next proceeding object.

At Step S210, check is made to see the updated object number O is less than Omax. If so, the processing returns to Step S223. If not, the processing advances to Step S211.

At Step S211, the distance L is updated for examining a proceeding position by light tracing.

At Step S212, the updated distance L is examined whether it is within the scanning range (display range) of the three-dimensional display or not. If so, the processing returns to Step S222. The updated result exceeding the scanning range shows that nothing has intercepted the light from the elementary hologram, i.e., the hologram must be displayed. Accordingly, the processing goes to Step S213 for display processing. At Step S213, light radiation is effected to obtain diffracted light or obtained information is stored in the memory. Then, the processing advances to Step S214.

At Step S214, the elementary hologram number is increased by 1 to examine a proceeding elementary hologram. At Step S115, the new elementary hologram number is checked to see it exceeds the preset value $H_{max}$. If not, the processing returns to Step S206 for processing a proceeding elementary hologram. If the new elementary hologram number exceeds the value $H_{max}$, the processing advances to Step S216 for examining a proceeding coordinate position.

At Step S216, the value x is increased by 1 to examine a proceeding pixel.

At Step S217, the updated number x is checked to see it exceeds the preset value $X_{max}$. If the value x is larger than the value $X_{max}$, the processing advances to Step S218. If not so, the processing returns to Step S204.

Steps S218 to S221 are performed for processing elementary holograms of the pixel in the y- and z-directions in the same manner as the processing in the x-direction.

Processing steps S206, S222, S207, S223, S224, S208, S225, S226, S209, S210, S211, S212, S213, S214 and S215 will be described referring to the embodiment of FIG. 37.

The following description relates to the case of processing, by way of example, 5 elementary holograms, i.e., in 5 diffracting directions R1 to R5, which are selected among elementary holograms composing a pixel point P being a component of the object O1.

A ray R1 of light is first traced. At Step S222, a voxel that the ray R1 first passes is found to be a voxel V4. At Step S207, the object to be processed is set to O1. At Step S208, the object O1 is found in the voxel V4. Steps S208, S225 and S226 are repeated to find the ray R1 being not shut-off by the object O1. Step S209 and S210 are performed to update the number of object and examine the next object O2.

At Step S223, the object O2 is not found in the voxel V4. Accordingly, the processing advances to Step S209, skipping unnecessary in this case Steps S224, S208, S225 and S226. The object O3 is next examined. This object is not found in the voxel V4. Therefore, the same processing as made for the object O2 is conducted.

The ray R1 passed the voxel V1 wherein no object exists. At Step S223, it is judged that no object exists. The processing advances to Step S209. The ray R1 then passed the voxel V2 wherein no object exists. The same processing as made for voxel V1 is repeated.

At Step S212, it is judged that the ray R1 exceeds the limit of scanning. The processing advances to Step S213 and then to Step S214 to process a proceeding elementary hologram.

The light ray R2 is traced in the same manner as the light ray R1, but the former passes through voxels V4, V5, V2 and V3 in the described order.

In tracing the light ray R3, the ray R3 passes the voxel V4 like the light ray R1 passed. The ray R3 passes further the voxel V5 and reaches the voxel V6 that does not contain the objects O1 and O2. Accordingly, Steps S224, S208, S225 and S226 become unnecessary to be performed.

The object O3 is contained in the voxel V6. At Step S208, the ray R3 is found to be intercepted by the object O3. Elementary holograms corresponding to this diffraction direction, therefore, are not to be illuminated by laser light.

In tracing the light ray R4, the ray R4 passes the voxel V4 like the light ray R1 passed. The ray R4 passes further the voxel V5 and reaches the voxel V8 wherein the object O2 exists alone. Steps S208, S225 and S226 for the object O2 are repeated. The ray R4 is found not-intercepted by the object O2. The ray enters into voxel V9 with no object therein and gets out of the scanning range. Accordingly, elementary holograms corresponding to this diffracting direction are determined to be illuminated by laser light.

In tracing the light ray R5, the ray R5 passes the voxel V4 like the light ray R1 passed. The ray R5 passes further the voxel V7 and reaches the voxel V8 wherein the object O2 exists alone. Steps S208, S225 and S226 for the object O2 are repeated. The ray R5 is intercepted by the object O2. Accordingly, elementary holograms corresponding to this diffracting direction are determined not to be illuminated by laser light.

The above-mentioned processing operations shall be repeated until all elementary holograms are found by checking at Step S215 to have been processed.

Every elementary hologram can be thus decided either to be illuminated or not to be illuminated.

For convenience of description, the above-mentioned embodiment adopted two-dimensionally divided areas to be traced but may trace three-dimensionally divided areas in the same way. Although the procedure was described for an image including three objects therein, it may be also applied to treat with any number (at least one) of objects.

Ninth embodiment:

This ninth embodiment is featured by using depth information for erasing hidden line and hidden surface when preparing before-described control data.

In this embodiment, a plurality of viewing points is first presumed. These viewing points are set on a sphere at the same distance from the three-dimensional image display device. In this instance, the distance is set at an average observing distance that observers may take when viewing a three-dimensional image, but it may not be limited thereto and may be set to any other desired distance. Setting the equidistant viewing points on a sphere is not necessarily required.

The number of viewing points corresponds to the number of all pixels on a scanning area surface of the three-dimensional display device (The scanning area surface has 22000 (100×100×2+100×5×4=22000) pixels according to the pixels (100×100×5) of a scanning area. The number of viewing points, however, may be set to any other desired value.

Positions of the viewing points in this case are evenly distributed to all solid angle. (But, even distribution of the viewing points is not necessarily required.) At every scanning position of the moving flat screen, all elementary holograms composing all pixels are assigned to respective viewing points from which respective holograms are most clearly seen depending on their diffracting directions.

The embodiment will be described below referring to FIG. 38.

Figure 38:
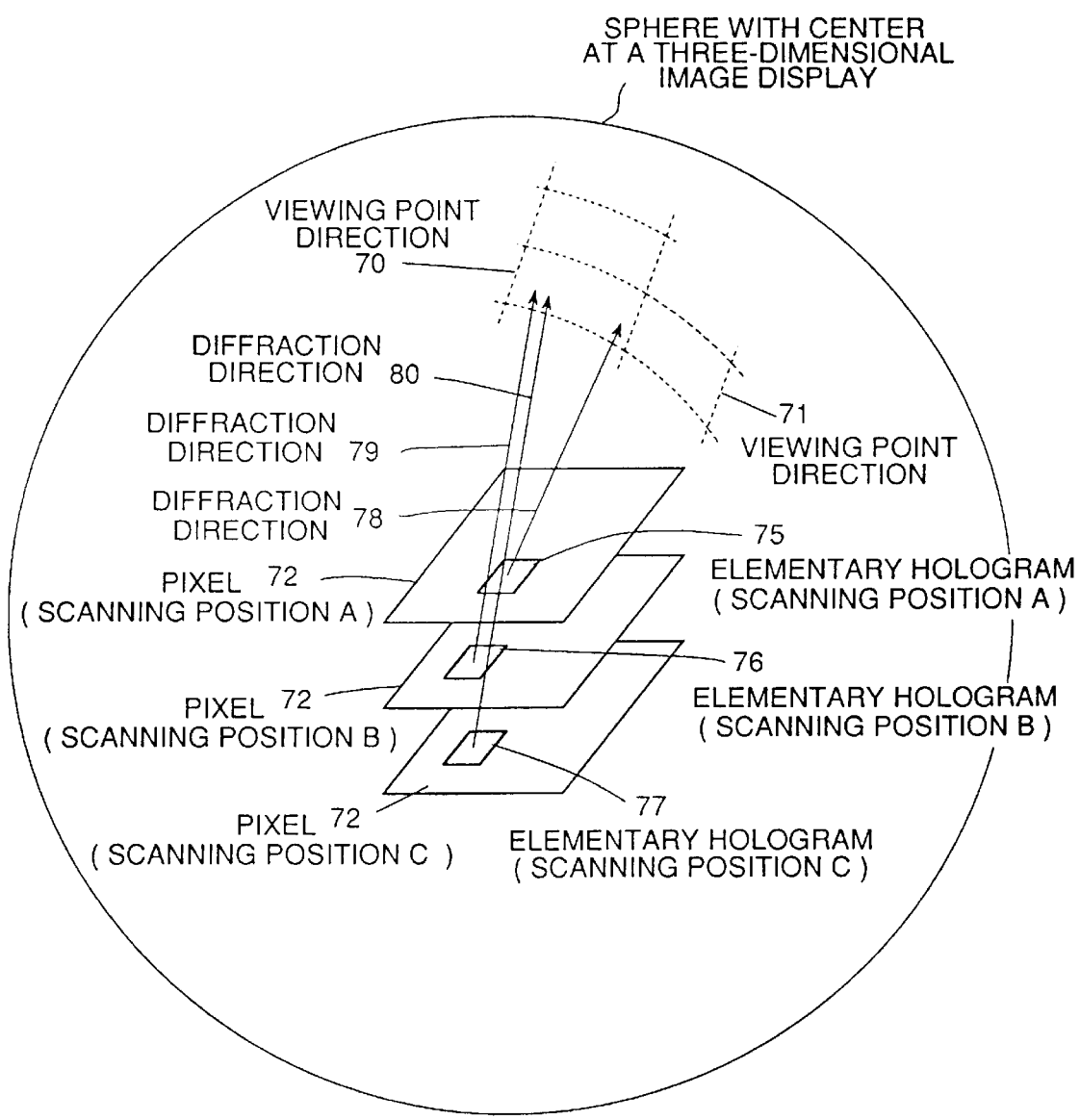
FIG. 38 is a view for explaining how to use image depth information when eliminating hidden lines and hidden surfaces.

FIG. 38 illustrates a part of a scanning space of the three-dimensional image display device, indicating viewing-point directions 70 and 71 and diffracting directions of elementary holograms for a pixel 72 in three scanning positions. The image (pixel) 72 is enlarged irrespective of an actual scale value.

Elementary holograms 75 (at scanning position A), 76 (at scanning position B) and 77 (at scanning position C) belong to the viewing-point direction 70. All viewing points are given serial numbers beginning at 1. Each viewing point has a list of combinations of belonging thereto elementary holograms and their scanning positions. In the list, the related elementary holograms are arranged in order of increasing distance from the viewing point and are numbered with corresponding serial numbers beginning at 1 for the head record therein.

A buffer for recording depth information is prepared, which has the number of elements equal to the number of the viewing points. The elements are given respective serial numbers beginning at 1. Numbers of combinations of elementary holograms and scanning positions viewed from the same viewing point are also recorded in the corresponding elements of the depth information buffer.

In this embodiment, processing is conducted for each elementary hologram on a point of an object. A hologram to be processed is specified by its coordinates and its serial number. The serial number of a viewing point to which said hologram belongs is known. In the list prepared for the viewing point, the serial number of the hologram in combination with its scanning position is found. Referring to the depth information buffer, the number of the recorded hologram in combination with its scanning position is also obtained.

The two numbers are compared with each other. The hidden line and/or the hidden surface can be eliminated by updating the depth information buffer only when the combination number of current hologram being processed is smaller than the recorded combination number (i.e., the current hologram exists nearer to the viewing point).

In other words, a new object to be displayed is compared with an object already processed and recorded in the buffer by each elementary hologram and scanning position to see the current object exists before the processed object. On the basis of the comparison result, only holograms existing nearer to the viewing point are recorded in place of the precedent holograms. This operation is performed on every object.

Figure 39:
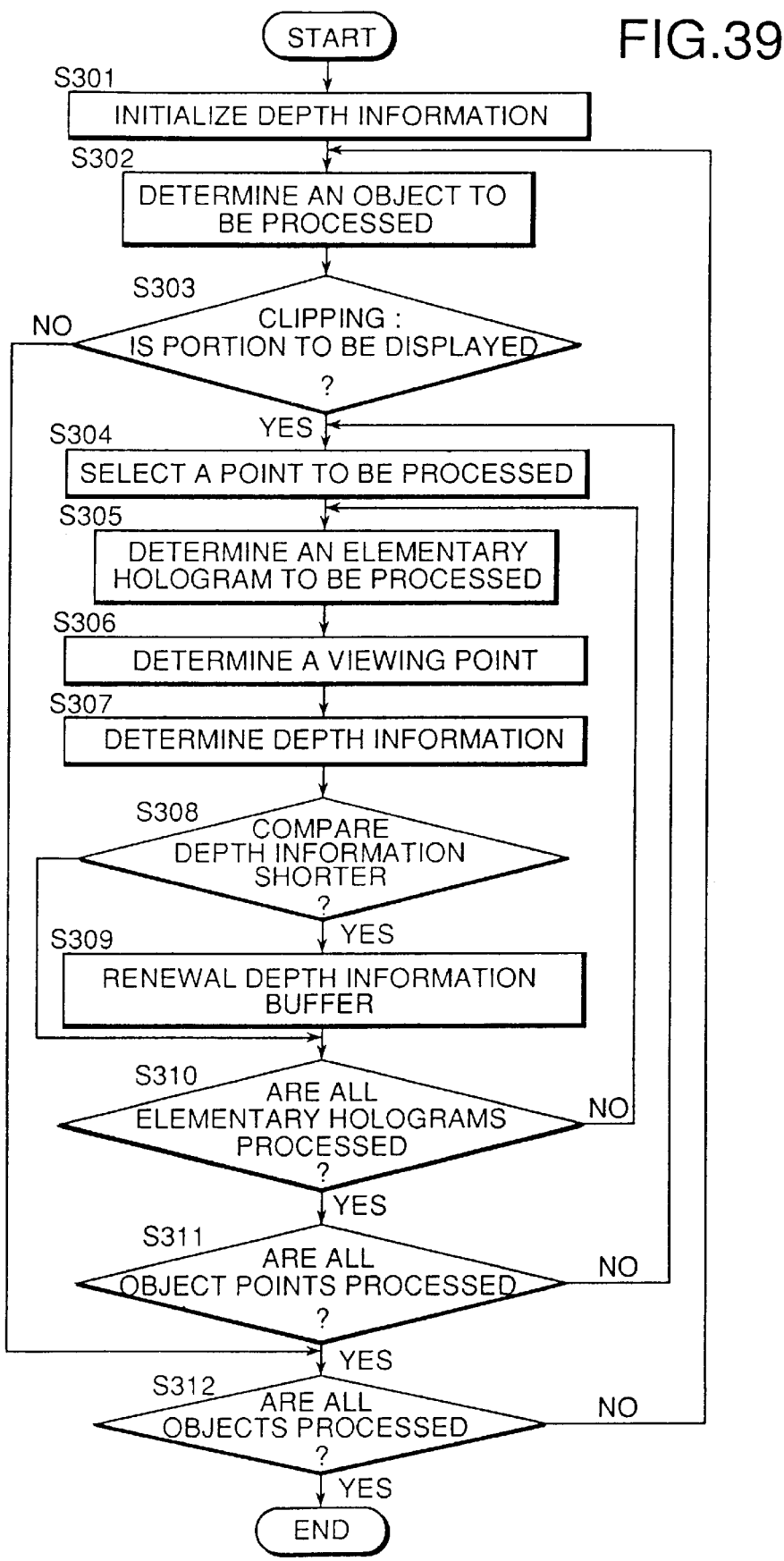
FIG. 39 is a flow chart representing a procedure for preparing control data using image depth information when eliminating hidden lines and hidden surfaces.

The procedure will be explained below in detail with reference to FIG. 39 showing processing steps for representing objects in this embodiment.

By way of example, the procedure is intended to display objects O1, O2 and O3 shown in FIG. 11.

At Step S301, the depth information buffer is first initialized by entering therein a value larger than the maximal value indicated in the list.

At Step S302, an object to be processed is decided. In this instance, objects O1, O2 and O3 will be processed in the indicated order.

At Step S303, clipping is made. Any part of each object, which exceeds the scanning area of the display, is not displayed. With a whole object being out of the scanning area, the processing branches to Step S312.

At Step S304, a point to be processed is selected on the object to be displayed.

At Step S305, an elementary hologram to be processed is selected on the object.

At Step S306, a viewing point is determined on the basis of the selected processing point and the selected hologram.

At Step S307, depth information is determined by a serial number indicated in the list for the viewing point.

At Step S308, the depth information is compared to see that a new elementary hologram exists nearer to the viewing point. Namely, the new depth information obtained at Step S307 for the selected hologram is compared with the depth information recorded in the depth information buffer to determine that the new information (number) is smaller than the recorded depth information (number). If not so, the processing goes to Step S310.

At step S309, the depth information buffer is updated with the value determined at Step S307.

At Step S310, judgment is made on whether all elementary holograms have been processed. The processing returns to Step S305 if there is any unprocessed hologram. When all holograms have been processed, the processing advances to Step S311.

At Step S311, judgment is made on whether all points composing an object have been processed. The processing returns to Step S304 if any unprocessed point remains. When all points have been processed, the processing advances to Step S312.

At Step S312, judgment is made on whether all objects have been processed. The processing returns to Step S302 if there is any unprocessed object.

Every viewing point may obtain combinations of scanning positions and related elementary holograms by performing the above-mentioned procedure.

The operation for representing the processed image data as a three-dimensional image is as follows:

Depth data for each viewing point is read out and combinations of scanning positions and elementary holograms to be illuminated are obtained from the data. These data to be sent to the control computer 7 are beforehand re-arranged. Every hologram in every scanning position is determined either to be illuminated or not to be illuminated. In this instance, if a specified viewing point has buffered depth information which value is left as an initialized value (larger than number in the list for the viewing point), all combinations of belonging thereto elementary holograms and scanning positions must not be illuminated.

Selection of elementary holograms to be illuminated or not to be illuminated can be achieved by the above-mentioned method. All these processings can be conducted in parallel at an increased processing speed. However, it is necessary not to enter updating data for another point being in parallel processing into the buffer between Steps S308 and S309.

Tenth embodiment:

In the embodiments No. 7 to 9, any hidden line or hidden surface to be shut off the view point by an object is erased and another hidden line or surface to be hidden by the hidden line or surface is not represented.

This embodiment, however, is capable of realizing the following functions to widen the field of its application.

Display with changed brightness;

The embodiment represents hidden portions that can not be indicated usually as a result of processing for erasing hidden lines and/or surfaces. In this instance, the image is displayed in semi-transparent mode at an averaged brightness of surface and hidden points.

Display with thinning;

Hidden portions that can not be indicated usually as a result of processing for erasing hidden lines and surfaces can be represented in wire frame. In this case, a line is represented by a chained line. A point putted in a chain has an average brightness of a surface point and a hidden point.

To realize the above-mentioned features in the seventh embodiment and the eighth embodiment, light tracing is carried out until light is intercepted twice by another object or another part of an object.

In the ninth embodiment, it may be realized by using two depth information buffers.

The advantages (1) to (18) undermentioned offered by the invention.

(1) A three-dimensional image display according to the present invention is capable of realizing outputting diffracted beams from respective diffraction elements composing each pixels of a display screen in different directions and in further controlled state and, therefore, can adapt itself for representing a variety of content of an image to be displayed, for example, for creating a three-dimensional image as be actually observed by controlling diffracted light not to be outputted in the direction of portion that must be hidden from specified viewing points. Accordingly, it can process many kinds of objects in an image and a large number of viewing points and may possess a wide field of its application.

(2) Another three-dimensional image display device according to the present invention has the same features as the above (1) and is further featured in that modulated light generating means is constructed of three separate functional components—light beam generating means, light modulating means and two-dimensional scanning means, and each component can be supplied as a changeable standard component.

(3) Another three-dimensional image display device has the same features as the above (1) and is further featured by its simplified construction that is achieved by using a screen integrally made with a modulated light generating means and being movable in a specified space, which screen is composed of a plurality of pixels each of which is composed of a plurality diffraction elements, which screen does not require the provision of any scanning optical system.

(4) Another three-dimensional image display device has the same features as the above (3) and is further featured by its compactness that is achieved by using the modulating means for spatially modulating the transmittance of light is a liquid crystal panel that does not require any optical scanning system.

(5) Another three-dimensional image display device has the same features as the above (1) and is further featured by its compact construction with no optical scanning system and no beam-diameter-enlarging optical system, which is realized by using a plurality of light-emitting elements, light-emitting element control means and a screen having the light-emitting elements made integrally therewith and movable in a specified space for displaying a three-dimensional image, which screen is composed of a plurality of pixels each consisting of a plurality of diffraction elements.

(6) Another three-dimensional image display device has the same features as the above (5) and is further featured by its compact construction that is realized by using an array of laser light-emitting elements with no need for optical systems for scanning and enlarging a beam diameter, and is also featured by an increased image resolution in direction of the moving flat screen owing to the laser light being modulated at high-speed.

(7) Another three-dimensional image display device has the same features as the above (5) and is further featured by its compact construction that is realized by using an array of light-emitting diodes with no need for optical systems for scanning and enlarging a beam diameter. The use of light-emitting diodes may also realize high-speed modulation and reduces a manufacturing cost of the device.

(8) Another three-dimensional image display device has the same features as defined in any one of the above (1) to (7) and is further characterized in that display screen can be effectively utilized within an area of spatial scanning by simply repeating parallel beam scanning and elementary hologram can be easily prepared under the same optical condition.

(9) Another three-dimensional image display device has the same features as the above (8) and is further featured by a wide viewing area of the image display, which is realized by the provision of means for allowing parallel beam of light to slantingly enter each of the diffraction elements.

(10) Another three-dimensional image display device has the same features as the above (9) and is further featured by a wide viewing area of its display image and compactness of its construction, which is realized by using the slant incident light generating means made integrally with the diffraction elements.

(11) Another three-dimensional image display device has the same features as the above (10) and is further featured by using optical fibers for generating slant incident light, whereby a viewing area of the image display can be widened even with light vertically entering a moving flat screen and compact design of the device is also realized.

(12) Another three-dimensional image display device has the same features as defined in any one of the above (1) to (11) and is further featured by using diffraction elements composing of elementary holograms prepared by photography, which can output diffracted beams in specified directions under the same optical conditions that the holograms were prepared. The diffraction elements are easy to manufacture and has an excellent performance, which may improve the quality of image quality of the device.

(13) Another three-dimensional image display device has the same features as defined in any one of the above (1) to (12) and is further featured by using blazed gratings that can effectively utilize light attaining a high brightness of image display and that does not produce any other diffracted light other than positive one-dimensional diffraction light realizing wide area of display image.

(14) Another three-dimensional image display device has the same features as defined in any one of the above (1) to (13) and is further characterized in that it is capable of representing a three-dimensional image being observed from any desired viewing point by erasing hidden lines and hidden surfaces on the basis of the viewing point data and the three-dimensional image data, thereby widening its application field.

(15) Another three-dimensional image display device has the same features as the above (14) and is further capable of practically realizing erasing the hidden lines and hidden surfaces.

(16) Another three-dimensional image display device has the same features as the above (15) and is also capable of easily performed light tracing according to its simplified procedure.

(17) Another three-dimensional image display device has the same features as the above (16) and is also capable of easily erasing hidden lines and hidden surfaces according to its simplified procedure.

(18) Another three-dimensional image display device has the same features as defined in any one of the above (1) to (17) and is further featured by using a screen having a plane or helical two-dimensional displaying area, which screen can be spatially scanned when moving (rotating) to the remaining one-dimensional area and which screen is easy to manufacture with excellent characteristics and can represent a stable high quality image.

We claim:

1. A three-dimensional image display device comprising:
   a screen;
   modulated light generating means for generating modulated light by specifying a radiating position on the screen and then by modulating light at the specified position on the screen;
   means for moving the screen so as to volumetrically scan a specified space;
   data-inputting means for inputting three-dimensional image data including an area of hidden-line and/or hidden surface processing data; and
   control means for controlling the above-mentioned respective means so as to display an image on the screen on the basis of the three-dimensional image data;
   wherein the screen is composed of a plurality of pixels, each of said pixels is composed of a plurality of diffraction elements and the control means control modulation of light to be produced by the light generating means and to be given to the diffraction elements respectively on the basis of the three-dimensional image data so as to direct diffraction rays of light from respective diffraction elements of each pixel to be seen as if the rays are emitted from a single light source.

2. A three-dimensional image display device as defined in claim 1, wherein the modulated light generating means is composed of beam producing means for generating coherent light, light modulating means for modulating the light beam and scanning means for two-dimensional scanning the light beam.

3. A three-dimensional image display device as defined in claim 1, wherein the modulated light generating means is composed of light generating means for simultaneously illuminating a whole screen surface, and modulating means for spatially modulating transmittance of light from the light generating means, and said modulating means is made integrally with the screen.

4. A three-dimensional image display device as defined in claim 3, wherein the modulating means for spatially modulating the transmittance of light is a liquid crystal panel.

5. A three-dimensional image display device as defined in claim 1, wherein the modulated light generating means is composed of a plurality of light-emitting elements which may be integrally made with the screen and which are disposed at respective radiation positions to be radiated and are capable of emitting light to be modulated.

6. A three-dimensional image display device as defined in claim 5, wherein an array of laser light-emitting elements is used as the plurality of the light-emitting elements.

7. A three-dimensional image display device as defined in claim 5, wherein an array of light-emitting diodes is used as the plurality of the light-emitting elements.

8. A three-dimensional image display device as defined in claim 1, wherein incident light entering each of the diffraction elements is a parallel beam of light.

9. A three-dimensional image display device as defined in claim 8, wherein the parallel beam of light slantingly enters each of the diffraction elements.

10. A three-dimensional image display device as defined in claim 9, wherein the slant incident light generating means may be made integrally with the diffraction elements.

11. A three-dimensional image display device as defined in claim 10, wherein the slant incident-light generating means to be integrally made with the diffraction elements is an optical fiber bundle.

12. A three-dimensional image display device as defined in claim 1, wherein the diffraction element is an elementary hologram.

13. A three-dimensional image display device as defined in claim 1, wherein the diffraction elements are made as a blazed diffraction grating.

14. A three-dimensional image display device as defined in claim 1, wherein the control means decides direction of diffraction light of a hidden line and/or a hidden surface among diffraction rays of light to be emitted from a plurality of the diffraction elements of a pixel according to the three-dimensional image data and then it controls modulation of light illuminating each of the diffraction elements of the pixel so as to remove the hidden line and/or hidden surface on the basis of the determined diffraction direction.

15. A three-dimensional image display device as defined in claim 14, wherein the direction of the diffraction light corresponding to the hidden line and/or hidden surface can be decided by determining interruption of the light beam with a three-dimensional image by tracing a ray of light to be emitted from each of the diffraction elements.

16. A three-dimensional image display device as defined in claim 15, wherein the three-dimensional image is divided into a plurality of areas for tracing the light ray.

17. A three-dimensional image display device as defined in claim 14, wherein the three-dimensional image data relates to depth of the image.

18. A three-dimensional image display device as defined in claim 1, wherein the pixels on the screen are distributed to compose two-dimensional areas and the screen moving means moves the screen along one remaining dimension.

* * * * *